United States Patent
Choi et al.

(10) Patent No.: US 10,981,797 B2
(45) Date of Patent: Apr. 20, 2021

(54) METHOD OF PREPARING ZEOLITE NANOSHEET VIA SIMPLE CALCINATION PROCESS AND ZEOLITE NANOSHEET PARTICLE PREPARED THEREBY

(71) Applicant: Korea University Research and Business Foundation, Seoul (KR)

(72) Inventors: Jungkyu Choi, Seoul (KR); Kwan Young Lee, Seoul (KR); Eun-Hee Jang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/993,479

(22) Filed: Aug. 14, 2020

(65) Prior Publication Data
US 2021/0047193 A1    Feb. 18, 2021

(30) Foreign Application Priority Data
Aug. 14, 2019    (KR) ......................... 10-2019-0099489

(51) Int. Cl.
| | |
|---|---|
| *C01B 39/48* | (2006.01) |
| *B01J 29/70* | (2006.01) |
| *C01B 39/02* | (2006.01) |
| *B01J 35/00* | (2006.01) |
| *B01J 37/04* | (2006.01) |
| *B01J 20/18* | (2006.01) |

(Continued)

(52) U.S. Cl.
CPC ........... *C01B 39/026* (2013.01); *B01J 20/183* (2013.01); *B01J 20/305* (2013.01); *B01J 20/3078* (2013.01); *B01J 29/7038* (2013.01); *B01J 35/0013* (2013.01); *B01J 37/04* (2013.01); *B01J 37/08* (2013.01); *C01B 3/56* (2013.01); *C01B 3/58* (2013.01); *C01B 39/48* (2013.01); *C01B 2203/042* (2013.01); *C01P 2004/24* (2013.01)

(58) Field of Classification Search
CPC ......... C01B 39/026; C01B 39/48; C01B 3/58; C01P 2004/20; C01P 2002/08; C01P 2004/24; B01J 35/065; B01J 29/7038; B01J 20/183
See application file for complete search history.

(56) References Cited

FOREIGN PATENT DOCUMENTS

KR    10-2010-0137222 A    12/2010

OTHER PUBLICATIONS

Narkhede, "Crystal Structure of MCM-22 (MWW) and Its Delaminated Zeolite ITQ-2 from High-Resolution Powder X-Ray Diffraction Data: An Analysis Using Rietveld Technique and Atomic Pair Distribution Function" Chem. Mater. 2009, 21, 18, 4339-4346 (Year: 2009).*

(Continued)

*Primary Examiner* — David M Brunsman
(74) *Attorney, Agent, or Firm* — NSIP Law

(57) ABSTRACT

Disclosed are a method of preparing a zeolite nanosheet and a zeolite nanosheet particle prepared thereby, and more particularly a method of preparing a zeolite nanosheet capable of preparing a monolayer zeolite nanosheet through a simple process of mixing a multilayer zeolite precursor with a swelling agent to swell the multilayer zeolite precursor and drying and calcining the multilayer zeolite precursor, wherein the monolayer zeolite nanosheet is useful to separate a catalyst or gas, and a zeolite nanosheet particle prepared thereby.

11 Claims, 13 Drawing Sheets
(12 of 13 Drawing Sheet(s) Filed in Color)

(a1)

(b1)

(a2)

(b2)

(51) Int. Cl.
  B01J 20/30    (2006.01)
  C01B 3/56     (2006.01)
  B01J 37/08    (2006.01)
  C01B 3/58     (2006.01)

(56) References Cited

OTHER PUBLICATIONS

Tsapatsis et al, "Hydrogen Selective Exfoliated Zeolite Membranes", United States: N. p., 2015. Web. doi:10.2172/1178537. (Year: 2015).*
Corma, A., Fornes, V., Pergher, S. et al. Delaminated zeolite precursors as selective acidic catalysts. Nature 396, 353-356 (1998). (Year: 1998).*
Corma et al, "Preparation, characterisation and catalytic activity of ITQ-2, a delaminated zeolite", Microporous and Mesoporous Materials vol. 38, Issues 2-3, Aug. 1, 2000, pp. 301-309 (Year: 2000).*
Degnan, Jr., "The implication of the fundamentals of shape selectivity for the development of catalysts for the petroleum and petrochemical industries," Journal of Catalysis, 2003, vol. 216, pp. 32-46.
Yilmaz et al., "Catalytic Applications of Zeolites in Chemical Industry," Top Catal, 2009, vol. 52, pp. 888-895.
Degan et al., "History of ZSM-5 fluid catalytic cracking additive development at Mobile," Microporous Mesoporous Materials, vol. 35-6, 2000, pp. 245-252.
Vispute et al., "Renewable Chemical Commodity Feedstocks from Integrated Catalytic Procssing of Pyrolysis Oils," Science, Nov. 26, 2010, vol. 330, pp. 1222-1227.
Choi et al., "Stable single-unit-cell nanosheets of zeolite MFI as active and long-lived catalysts," Nature, Sep. 10, 2009, vol. 461, 246-249.
Groen et al., "Desilication: on the controlled generation of mesoporosity in MFI zeolites," Journal of Materials Chemistry, 2006, vol. 16, pp. 2121-2131.
Groen et al., "Optimal Aluminum-Assisted Mesoporosity Development in MFI Zeolites by Desilication," J. Phys. Chem. B, 2004, vol. 108, pp. 13062-13605.
Perez-Ramirez et al., "Zeolite Catalysts with Tunable Hierachy Factor by Pore-Growth Moderators," Advanced Functional Materials, 2009, vol. 19, pp. 3972-3979.
Na et al., "Directing Zeolite Structures into Hierarchically Nanoporous Architectures," Science Jul. 15, 2011, vol. 333, pp. 328-332.
Zhang et al., "Synthesis of Self-Pillared Zeolite Nanosheets by Repetitive Branching," Science, Jun. 29, 2012, vol. 336, pp. 1684-1687.
Mitchell et al., "Structural analysis of hierarchically organized Zeolites," Nature Communications, Oct. 20, 2015, vol. 6, pp. 1-14.
Verboekend et al., "Hierarchical Y and USY Zeolites Designed by Post-Synthetic Strategies," Advanced Functional Materials, 2012, vol. 22, pp. 916-928.
Moliner et al., "Towards the Rational Design of Efficient Organic Structure-Directing Agents for Zeolite Synthesis," Angew. Chem. Int. Ed., 2013, vol. 52, pp. 13880-13889.
Jiang et al., "Synthesis and Structure Determination of the Hierarchical Meso-Microporous Zeolite ITQ-43," Science, Aug. 26, 2011, vol. 333, pp. 1131-1134.
Degan et al., "Alkylation of aromatics with ethylene and propylene: recent developments in commercial processes," Applied Catalysis A: General, 2001, vol. 221, pp. 283-294.
Corma et al., "Characterization and Catalytic Activity of MCM-22 and MCM-56 Compared with ITQ-2," Journal of Catalysis, 2000, vol. 191, pp. 218-224.
Vermeiren et al., "Impact of Zeolites on the Petroleum and Petrochemical Industry," Top Catal, 2009, vol. 52, pp. 1131-1161.
Roth et al., "MCM-36: The First Pillared Molecular Sieve with Zeolite Properties," Studies in Surface Science and Catalysis, 1995, vol. 94, pp. 301-308.
Corma et al., "Delaminated zeolite precursors as selective acidic catalysts," Nature, Nov. 26, 1998, vol. 396, pp. 353-356.
Wang et al., "Post-transformation of MWW-type lamellar precursors into MCM-56 analogues," Microporous and Mesoporous Materials, 2008, vol. 113, pp. 435-444.
Varoon et al., "Dispersible Exfoliated Zeolite Nanosheets and Their Application as a Selective Membrane," Science, Oct. 7, 2011, vol. 334, pp. 72-75.
Leonowicz et al., "MCM-22: A Molecular Sieve with Two Independent Multidimensional Channel Systems," Science, Jun. 24, 1994, vol. 264, pp. 1910-1913.
Corma et al., "Synthesis and characterization of the MCM-22 zeolite," Zeolites, 1995, vol. 15, pp. 2-8.
Lawton et al., "Twelve-ring pockets on the external surface of MCM-22 crystals," Microporous and Mesoporous Materials, 1998, vol. 23, pp. 109-117.
Corma et al., "Delaminated Zeolites: Combining the Benefits of Zeolites and Mesoporous Materials for Catalytic Uses," Journal of Catalysis, 1999, vol. 186, pp. 57-63.
Polozij et al., "Theoretical investigation of layered zeolites with MWW topology: MCM-22P vs. MCM-56," Dalton Transactions, 2014, vol. 43, pp. 10443-10450.
Liu et al., "Generation of subnanometric platinum with high stability during transformation of a 2D zeolite into 3D," Nature Materials, Jan. 2017, vol. 16, pp. 132-1398.
Osman et al., "Influencing the acitvity and selectivity of alkylaromatic catalytic transformations by varying the degree of delamination in MWW zeolites," Catalysis Science & Technology, 2016, vol. 6, pp. 3166-3181.
Corma et al., "Catalytic Performance of the New Delaminated ITQ-2 Zeolite for Mild Hydrocracking and Aromatic Hydrogenation Processes," Journal of Catalysis, 2001, vol. 200, pp. 259-269.
Liu et al., "Activity and selectivity differences of external Brønsted acid sitesof single-unit-cell thick and conventional MFI and MWW zeolites," Microporous and Mesoporous Materials, 2014, vol. 200, pp. 287-290.
Arias et al., "Two-Dimensional ITQ-2 Zeolite for Biomass Transformation: Synthesis of Alkyl 5-Benzyl-2-furoates as Intermediates for Fine Chemicals," ACS Sustainable Chemistry & Engineering, 2016, vol. 4, pp. 6152-6159.
Rodrigues et al., "Glycerol dehydration catalyzed by MWW zeolites and the changes inthe catalyst deactivation caused by porosity modification," Applied Catalysis A: General, 2015, vol. 495, pp. 84-91.
Maheshwari et al., "Layer Structure Preservation during Swelling Pillaring, and Exfoliation of a Zeolite Precursor," J. Am. Chem. Soc., 2008, vol. 130, pp. 1507-1516.
Schwanke et al, "The influence of swelling agents molecular dimensions on lamellar morphology of MWW-type zeolites active for fructose conversion," Microporous and Mesoporous Materials, 2017, vol. 254, pp. 17-27.
Frontera et al., "Transformation of MCM-22(P) into ITQ-2: The role of framework aluminium," Microporous and Mesoporous Materials, 2007, vol. 106, pp. 107-114.
Ogino et al., "Delamination of Layered Zeolite Precursors under Mild Conditions: Synthesis of UCB-1 via Fluoride/Chloride Anion-Promoted Exfoliation," Journal of the American Chemical Society, 2011, vol. 133, pp. 3288-3291.
Maluangnont et al., "The aqueous colloidal suspension of ultrathin 2D MCM-22P crystallites," Chem. Commun., 2014, vol. 50, pp. 7378-7381.
Luo et al., "One-pot synthesis of MWW zeolite nanosheets using a rationally designed organic structure-directing agent," Chemical Science, 2015, vol. 6, pp. 6320-6324.
Margarit et al., "Direct Dual-Template Synthesis of MWW Zeolite Monolayers," Angew. Chem., 2015, vol. 127, pp. 13928-13932.
Ouyang et al., "Single-Step Delamination of a MWW Borosilicate Layered Zeolite Precursor under Mild Conditions without Surfactant and Sonication," Journal of the American Chemical Society, 2014, vol. 136, pp. 1449-1461.
Ouyang et al., "Novel surfactant-free route to delaminated all-silica and titanosilicate zeolites derived from a layered borosilicate MWW precursor," Dalton Transactions, 2014, vol. 43, pp. 10417-10429.

(56) References Cited

OTHER PUBLICATIONS

Martinez et al., "Inorganic molecular sieves: Preparation, modification and industrial application in catalytic processes," Coordination Chemistry Reviews, 2011, vol. 255, pp. 1558-1580.

Gora-Marek et al., "2,6-Di-tert-butylpyridine Sorption Approach to Quantify the External Acidity in Hierarchical Zeolites," The Journal of Physical Chemistry C, 2014, vol. 118, pp. 12266-12274.

Bai et al., "TraPPE-zeo: Transferable Potentials for Phase Equilibria Force Field for All-Silican Zeolites," The Journal of Physical Chemistry C, 2013, vol. 117, pp. 24375-24387.

Dubbeldam et al., "Molecular simulation of adsorption sites of light gases in the metal-organic framework IRMOF-1," Fluid Phase Equilibria, 2007, vol. 261, pp. 152-161.

Jin et al., "New mesoporous titanosilicate MCM-36 material synthesized by pillaring layered ERB-1 precursor," Journal of Materials Chemistry A, 2015, vol. 3, pp. 8715-8724.

Juttu et al., "Characterization and catalytic properties of MCM-56 and MCM-22 zeolites," Microporous and Mesoporous Materials, 2000, vol. 40, pp. 9-23.

Treacy et al., "A general recursion method for calculating diffracted intensities from crystals containing planar faults," Royal Society, Mathematical and Physical Sciences; Jun. 8, 1991, vol. 433, pp. 499-520.

He et al. "Synthesis, characterization and catalytic activity of the pillared molecular sieve MCM-36," Microporous Mesoporous Materials, 1998 vol. 25, pp. 207-224.

Corma et al., "Preparation, characterisation and catalytic activity of ITQ-2, a delaminated zeolite," Microporous and Mesoporous Materials, 2000, vol. 38, pp. 301-309.

Galarneau et al., "Validity of the t-plot Method to Assess Microporosity in Hierarchical Micro/Mesoporous Materials," Langmuir, 2014, vol. 30, pp. 13266-13274.

Ayrault et al., "Characterization of the Internal and External Acidity of H-MCM-22 Zeolites," J. Phys. Chem. B, 2004, vol. 108, pp. 13755-13763.

Kim et al., "On methanol to hydrocarbons reactions in a hierarchically structured ZSM-5 zeolite catalyst," Catalysis Today, 2018, vol. 303, pp. 150-158.

Khare et al., "A mechanistic basis for the effect of aluminum content on ethene selectivity in methanol-to-hydrocarbons conversion on HZSM-5," Journal of Catalysis, 2017, vol. 348, pp. 300-305.

Zhang et al., "The performance of HMCM-22 zeolite catalyst on the olefin alkylation thiophenic sulfur in gasoline" Catalysis Communications, 2008, vol. 9, pp. 60-64.

Kumar et al., "Synthesis, characterisation and catalytic performance of HMCM-22 of different silica to alumina ratios," Journal of Molecular Catalysis A: Chemical, 2007, vol. 272, pp. 38-44.

Vuono et al., "Influence of NaOH and KOH on the synthesis of MCM-22 and MCM-49 zeolites," Microporous and Mesoporous Materials, 2006, vol. 97, pp. 78-87.

Camblor et al., "Synthesis and Structural Characterization of MWW Type Zeolite ITQ-1, the Pure Silica Analog of MCM-22 and SSZ-25," J. Phys. Chem. B, 1998, vol. 102, pp. 44-51.

Aiello et al., "Synthesis and characterization of aluminosilicate MCM-22 in basic media in the presence of fluoride salts," Microporous and Mesoporous Materials, 2000, vol. 35-36, pp. 585-595.

Elyassi et al., "Long-term steam stability of MWW structure zeolites (MCM-22 and ITQ-1)," Microporous and Mesoporous Materials, 2014, vol. 193, pp. 134-144.

Kennedy et al., "$^{29}$Si MAS NMR Studies of a High Silica Form of the Novel Molecular Sieve: MCM-22," J. Am. Chem. Soc., 1994, vol. 116, pp. 11000-11003.

Korean Office Action dated Jan. 19, 2021 in counterpart Korean Patent Application No. 10-2019-0099489 (6 pages in English and 6 pages in Korean).

\* cited by examiner

METHOD OF PREPARING ZEOLITE NANOSHEET VIA SIMPLE CALCINATION PROCESS AND ZEOLITE NANOSHEET PARTICLE PREPARED THEREBY

CROSS-REFERENCE TO RELATED APPLICATIONS

This application claims the benefit under 35 USC § 119(a) of Korean Patent Application No. 10-2019-0099489 filed on Aug. 14, 2019 in the Korean Intellectual Property Office, the entire disclosure of which is incorporated herein by reference for all purposes.

TECHNICAL FIELD

The present invention relates to a method of preparing a zeolite nanosheet and a zeolite nanosheet particle prepared thereby. More particularly, the present invention relates to a method of preparing a zeolite nanosheet capable of preparing a monolayer zeolite nanosheet through a simple process of mixing a multilayer zeolite precursor with a swelling agent to swell the multilayer zeolite precursor and drying and calcining the multilayer zeolite precursor, wherein the monolayer zeolite nanosheet can used as a catalyst in an alkylation process, and a zeolite nanosheet particle prepared thereby.

BACKGROUND ART

Zeolites are microporous crystalline materials and are widely used as catalysts/supports and adsorbents in the refinery/petrochemical industries because of their large surface areas, unique pore structures, and acidities (Degnan, T. F., J. Catal., 2003, 216, 32-46; Yilmaz, B. et al., Top. Catal., 2009, 52, 888-895; Degnan, T. F. et al., Microporous Mesoporous Mater., 2000, 35-6, 245-252; Vispute, T. P. et al., Science, 2010, 330, 1222-1227). Despite their widespread use in industry, zeolites suffer one particular disadvantage; the pore sizes (less than about 0.8 nm) are small with respect to reactants used in refinery/petrochemical industries; thus, methods to increase the accessibility of pores, which permit access to the active sites is highly desirable. One such effective approach is based on the introduction of mesopores into conventional zeolites, which results in a hierarchical porous structure (Choi, M. et al., Nature, 2009, 461, 246-249; Groen, J. C. et al., J. Mater. Chem., 2006, 16, 2121-2131; Groen, J. C. et al., J. Am. Chem. Soc., 2007, 129, 355-360; Perez-Ramirez, J. et al., Adv. Funct. Mater., 2009, 19, 3972-3979; Na, K. et al., Science, 2011, 333, 328-332; Zhang, X. Y. et al., Science, 2012, 336, 1684-1687). Conventionally, mesopores can be created in the microporous zeolite via so-called top-down strategies, such as desilication or dealumination processes (Groen, J. C. et al., J. Mater. Chem., 2006, 16, 2121-2131; Groen, J. C. et al., J. Am. Chem. Soc., 2007, 129, 355-360; Perez-Ramirez, J. et al., Adv. Funct. Mater., 2009, 19, 3972-3979; Mitchell, S. et al., J., Nat. Commun., 2015, 6, 14; Verboekend, D. et al., J., Adv. Funct. Mater., 2012, 22, 916-928). However, the resulting particles often show random mesopore formation and low reproducibility. On the other hand, a hierarchically structured zeolite can be synthesized using organic structure-directing agents (OSDAs), which typically contain long carbon chains with ammonium groups (Choi, M. et al., Nature, 2009, 461, 246-249; Na, K. et al., Science, 2011, 333, 328-332; Moliner, M. et al., Angew. Chem.-Int. Edit., 2013, 52, 13880-13889; Jiang, J. X. et al., Science, 2011, 333, 1131-1134). Although the resulting particles have hierarchical porous structures, the appropriate OSDAs often require labor-intensive synthesis and are inevitably costly.

Among the many types of zeolites, MCM-22 (Mobile Composition of Matter-22), a representative MWW type zeolite, has been widely studied, because it has pore sizes similar to those of ZSM-5 but provides a unique product distribution (Degnan, T. F. et al., Appl. Catal. A-Gen., 2001, 221, 283-294; Corma, A. et al., J. Catal., 2000, 192, 163-173; Vermeiren, W. et al., Top. Catal., 2009, 52, 1131-1161) and, more importantly, can act as a platform for further structural transformations (Roth, W. J. et al., Sci. Catal., 1995, 94, 301-308; Corma, A. et al., Nature, 1998, 396, 353-356; Wang, L. L. et al., Microporous Mesoporous Mater., 2008, 113, 435-444; Varoon, K. et al., Science, 2011, 334, 72-75). Specifically, MCM-22 is formed by condensing the adjacent layers in a MCM-22 precursor (MCM-22(P)) along the c-axis and contains two independent pore systems. FIG. 1 shows schematic images of (a1)-(a2) MWW type zeolite pore structures and (b1)-(b2) delaminated MWW type zeolite pore structures. Individual pores are indicated with differently colored arrows (red for an intra-layer 10 MR pore window, blue for an inter-layer 10 MR pore window, and black for 12 MR supercages). In (a1)-(b 1), the structural changes of the inter-layer 10 MR pore window and 12 MR supercages during the delamination process are indicated by the blue- and black-boxed regions, respectively. In particular, a 12 MR cup or half-supercage exposed after the delamination process is indicated by a gray arrow in (b1). One includes sinusoidal 10 membered-ring (MR) pores inside the MWW layer and the other includes large cylindrical 12 MR supercages or pockets (indicated by the black arrow in FIG. 1) (Leonowicz, M. E. et al., Science, 1994, 264, 1910-1913; Corma, A. et al., J., Zeolites, 1995, 15, 2-8; Lawton, S. et al., Microporous Mesoporous Mater., 1998, 23, 109-117). The outer surface of MCM-22 is terminated with the opened 12 MR half-cup (indicated by the blue arrow in FIG. 1), which is known to selectively host large organic molecules (Lawton, S. et al., Microporous Mesoporous Mater., 1998, 23, 109-117). In fact, direct exposure of the 12 MR half-cups to reactants with a comparable molecular size provides unique and greatly improved real-world catalytic performance (Degnan, T. F. et al., Appl. Catal. A-Gen., 2001, 221, 283-294; Lawton, S. et al., Microporous Mesoporous Mater., 1998, 23, 109-117).

Regarding its use as a platform for obtaining other structural types, MCM-22(P) can be transformed into (1) MCM-36 via pillaring (Roth, W. J. et al., Sci. Catal., 1995, 94, 301-308; He, Y. J. et al., J. A., Microporous Mesoporous Mater., 1998, 25, 207-224), (2) ITQ-2 (Instituto de Tecnologia Quimica Valencia-2) via delamination (Corma, A. et al., Nature, 1998, 396, 353-356; Wang, L. L. et al., Microporous Mesoporous Mater., 2008, 113, 435-444.19; Corma, A. et al., J. Catal., 2000, 191, 218-224; Corma, A. et al., Microporous Mesoporous Mater., 2000, 38, 301-309; Corma, A. et al., J. Catal., 1999, 186, 57-63), and (3) MCM-56 via mild acid treatment (Corma, A. et al., J. Catal., 2000, 191, 218-224; Corma, A. et al., Microporous Mesoporous Mater., 2000, 38, 301-309; Corma, A. et al., J. Catal., 1999, 186, 57-63; Polozij, M. et al., Dalton Trans., 2014, 43, 10443-10450). Recently, it was demonstrated that swollen MCM-22(P) can encapsulate Pt clusters within the 12 MR supercages (Liu, L. C. et al., Nat. Mater., 2017, 16, 132-138). Because both MCM-36 and ITQ-2 provided better accessibility to the acid sites than MCM-22, an improvement in catalytic performance was secured, along with improved resistance to deactivation (Mitchell, S. et al., J., Nat. Commun., 2015, 6, 14; Corma, A. et al., J. Catal., 2000, 191, 218-224; Corma, A. et al., J. Catal., 2000, 191, 218-224; Osman, M. et al., Catal. Sci. Technol., 2016, 6, 3166-3181; Corma, A. et al., J. Catal., 2001, 200, 259-269; Liu, D. X. et al., Microporous Mesoporous Mater., 2014, 200, 287-290; Arias, K. S. et al., ACS Sustain. Chem. Eng., 2016, 4, 6152-6159; Rodrigues, M. V. et al., Appl. Catal. A-Gen., 2015, 495, 84-91). On the basis of these promising results, a precise understanding of the physicochemical properties of these hierarchically structured particles is required in order to understand their catalytic performance.

However, the multiple steps required to obtain these hierarchically structured particles should be simplified. In particular, a procedure for obtaining ITQ-2 is still elusive, though several studies have reported the synthesis of ITQ-2 through various reactions and the benefits thereof (Corma, A. et al., Nature, 1998, 396, 353-356; Corma, A. et al., J. Catal., 2000, 191, 218-224; Corma, A. et al., J. Catal., 1999, 186, 57-63). Thus, many studies have attempted to identify the required swelling and delamination steps (Maheshwari, S. et al., J. Am. Chem. Soc., 2008, 130, 1507-1516; Schwanke, A. J. et al., Microporous Mesoporous Mater., 2017, 254, 17-27). It has been demonstrated that the MWW type zeolite structure was damaged with respect to the swelling process at high temperatures (80° C.) (Maheshwari, S. et al., J. Am. Chem. Soc., 2008, 130, 1507-1516; Schwanke, A. J. et al., Microporous Mesoporous Mater., 2017, 254, 17-27). In contrast, swelling conducted at room temperature helped to preserve the MWW structure, and subsequent melt blending with polystyrene led to delamination to an about 2.5 nm thick nanosheet, which is equivalent to a nanosheet of the MWW type zeolite consisting of one unit cell in the c-direction (Varoon, K. et al., Science, 2011, 334, 72-75). For convenience, one unit cell in the c-direction is denoted UC. The critical role of sonication for delamination was further investigated, revealing that prolonged sonication could result in the formation of an undesirable mesoporous structure (Frontera, P. et al., Microporous Mesoporous Mater., 2007, 106, 107-114). In addition, an approach using a low pH for swelling with the help of different swelling agents such as tetrapropylammonium fluoride and tetrapropylammonium chloride was effective for delamination and did not require ultrasonication (Ogino, I. et al., J. Am. Chem. Soc., 2011, 133, 3288-3291; Maluangnont, T. et al., Chem. Commun., 2014, 50, 7378-7381).

As described above, the conventional multilayer zeolite delamination method (ITQ-2 synthesis method) further includes very severe post-treatment processes, such as (1) inter-layer swelling of the zeolite through basic solution processing at high temperatures, (2) structure separation through ultrasonic stimulation, and (3) introduction of hydrochloric acid. Such severe post-treatments tend to collapse the inherent porous structure of the zeolite.

Also, an approach to synthesize 1 UC nanosheets of MWW type zeolite was recently attempted using new types of OSDAs (Luo, H. Y. et al., Chem. Sci., 2015, 6, 6320-6324; Margarit, V. J. et al., Angew. Chem.-Int. Edit., 2015, 54, 13724-13728). However, the above approach requires the preparation and use of organic structure-directing agents, mass production is difficult due to the problem of high cost thereof, etc. In addition, an approach to synthesize nanosheets was attempted by isomorphous replacement of boron atoms in borosilicate MWW type zeolites (Ouyang, X. Y. et al., J. Am. Chem. Soc., 2014, 136, 1449-1461; Ouyang, X. Y. et al., Dalton Trans., 2014, 43, 10417-10429). However, this approach is applicable only to zeolites including boron atoms.

Despite the effectiveness of the aforementioned approaches, a reliable methodology that allows for the delamination of swollen MCM-22(P) without harming the original structure thereof is highly desirable as a simple method to exfoliate MCM-22(P) layers and thus to prepare a zeolite nanosheet having the inherent pore structure of zeolite (Martinez, C. et al., Coord. Chem. Rev., 2011, 255, 1558-1580).

Therefore, as the result of extensive efforts to solve these problems, the present inventors found that a monolayer zeolite nanosheet can be prepared through a simple process of mixing a multilayer zeolite precursor with a swelling agent to swell the multilayer zeolite precursor and drying and calcining the multilayer zeolite precursor, the prepared monolayer zeolite can be used as a commercial catalyst in an alkylation process, accessibility to reactants is improved, whereby reaction activity is increased, and products are more easily discharged, whereby the lifetime of the catalyst is also increased. The present invention has been completed based on this finding.

SUMMARY OF THE INVENTION

Therefore, the present invention has been made in view of the above problems, and it is one object of the present invention to provide a preparation method capable of synthesizing a zeolite nanosheet having a monolayer structure through a simple calcination process, rather than a conventional complicated process, and a monolayer zeolite nanosheet prepared thereby.

It is another object of the present invention for synthesizing a monolayer zeolite nanosheet prepared by above method to provide a catalyst or a method for separating $H_2$.

To accomplish the above object, the present invention provides a method of preparing a monolayer zeolite nanosheet comprising: (a) mixing a multilayer zeolite precursor with water and a swelling agent to swell intra-layers of the multilayer zeolite precursor; and (b) recovering a solid material from the mixture containing a swollen zeolite precursor, and then calcining the solid material to obtain a monolayer zeolite nanosheet.

Also, the present invention provides a monolayer zeolite nanosheet prepared by the above method, wherein nanosheets having a thickness of 2.0 to 3.0 nm of a layer, are aggregated into one or two layers in a c-direction to compose of three to four layers having a thickness of 2.0 to 14 nm.

In addition, the present invention provides a catalyst comprising the monolayer zeolite nanosheet.

Furthermore, the present invention provides a method of separating $H_2$ comprising contacting the monolayer zeolite nanosheet with a mixture containing $H_2$ to separate $H_2$ from the mixture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

Figure 1:
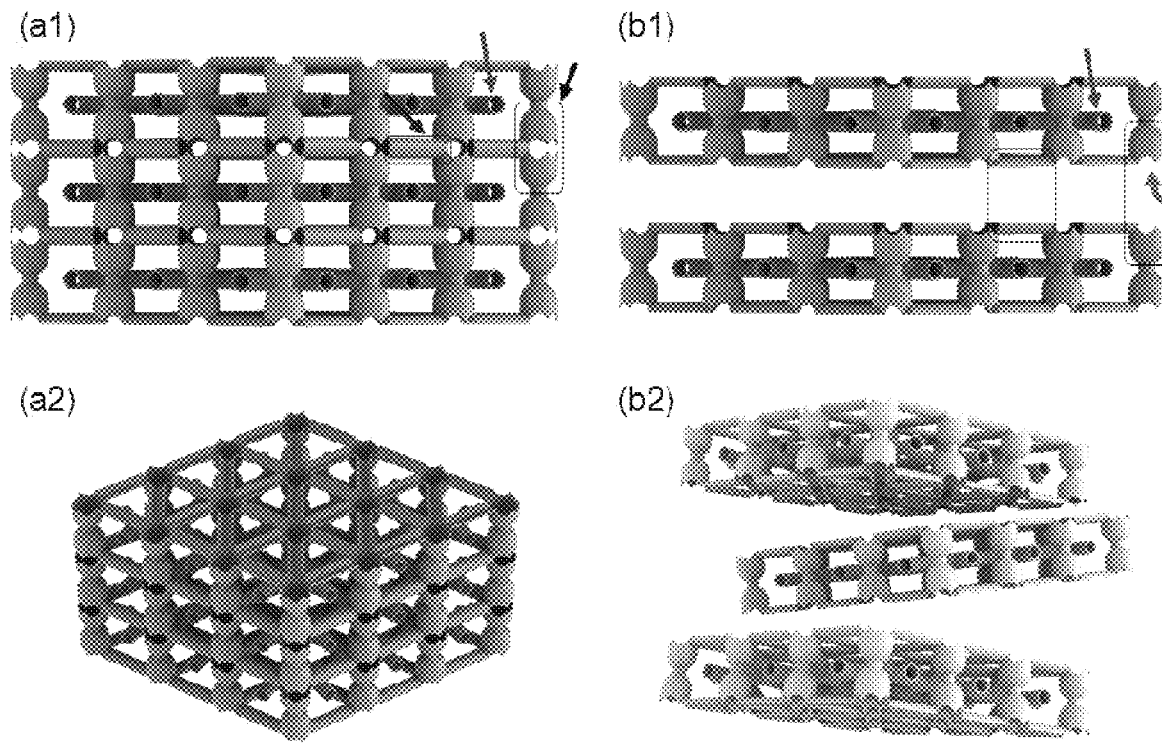
FIG. 1 shows schematic images of (a1)-(a2) MWW type zeolite pore structures and (b1)-(b2) delaminated MWW type zeolite pore structures according to an embodiment of the present invention.

Unless defined otherwise, all technical and scientific terms used herein have the same meanings as appreciated by those skilled in the field to which the present invention pertains. In general, the nomenclature used herein is well-known in the art and is ordinarily used.

In the present invention, it was found that a monolayer zeolite nanosheet can be prepared through a simple process of mixing a multilayer zeolite precursor with a swelling agent to swell the multilayer zeolite precursor and drying and calcining the multilayer zeolite precursor.

Thus, in one aspect, the present invention relates to a method of preparing a monolayer zeolite nanosheet comprising: (a) mixing a multilayer zeolite precursor with water and a swelling agent to swell intra-layers of the multilayer zeolite precursor; and (b) recovering a solid material from the mixture containing a swollen zeolite precursor, and then calcining the solid material to obtain a monolayer zeolite nanosheet.

In the present invention, it was found that effective delamination is possible through inter-layer swelling and calcination at room temperature, and a simple method of exfoliating layered MCM-22(P) into a few UC nanosheets (UC indicating a nanosheet of an MWW zeolite in c-direction) is provided. In particular, the structural and textural properties of hierarchically structured particles were rigorously investigated, along with the simulated porous structure. The present inventors have focused on the determination of how many layers along the c-axis were present in the resulting particles. In addition, the results of the selective titration of acid sites using two types of probes (one that can enter the 10-MR pores and one that is only accessible to the external area) were consistent with the textural properties.

A layered precursor of MCM-22 (MCM-22(P)), a representative MWW type zeolite used in the present invention, is a flexible, reliable platform for structural transformation via inter-layer swelling and subsequent pillaring/delamination. In particular, the delaminated MWW type zeolite, which is a few nanometers thick, is desirable for overcoming diffusion limits. In addition, 12 membered-ring (MR) pores, which are otherwise difficult to access because of the small 10 MR pores between the 12 MR pores, are exposed in the delaminated MCM-22 configuration. Despite the promise thereof, the conventional procedure to acquire the delaminated MCM-22 is complicated. The present invention provides a simple, effective method of exfoliating MCM-22(P) into nanosheets. Calcination of swollen MCM-22(P) was found to result in successful delamination. A rigorous analysis of the structural and textural properties of the resulting delaminated layers revealed that a majority of the nanosheets had a 3 to 4 unit cell thickness along the c-axis, which were further formed via aggregation of particles having about 1 to 2 unit cell thickness. In addition, the resulting monolayer structure particles retained the original MCM-22 zeolite structure, further demonstrating the usefulness of the method according to the present invention.

According to an embodiment of the present invention, a multilayer zeolite precursor is mixed with water and a swelling agent to swell the multilayer zeolite precursor, the mixture containing the swollen zeolite precursor is centrifuged to recover a solid material, and the solid material is dried and calcined to recover a monolayer zeolite nanosheet.

In the present invention, the Si/Al ratio of the zeolite precursor may be 10 to 200.

The swelling agent, which is a material that functions to swell the multilayer zeolite precursor, may be a mixture of a salt compound containing a functional group of alkyltrimethylammonium ($CH_3(CH_2)$—$N(CH_3)_3$—, n=11, 15, or 17) and a salt compound containing a functional group of tetrapropylammonium (($C_3H_7)_4N$—)).

In the present invention, preferably, the salt compound having the functional group of alkyltrimethylammonium may be one or more selected from the group consisting of dodecyltrimethylammonium bromide (C12TAB) of Chemical Formula 1, cetrimonium bromide (C16TAB or CTAB) of Chemical Formula 2, and trimethyloctadecylammonium bromide (C18TAB) of Chemical Formula 3.

[Chemical Formula 1]

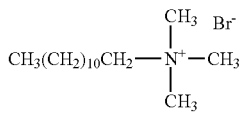

[Chemical Formula 2]

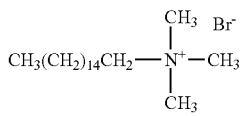

[Chemical Formula 3]

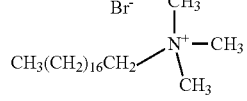

In the present invention, the salt compound having the functional group of tetrapropylammonium (($C_3H_7)_4N$—)) may be one or more selected from the group consisting of tetrapropylammonium bromide (TPABr), tetrapropylammonium fluoride (TBAF), and tetrapropylammonium chloride (TPACl) of Chemical Formula 4 and tetrapropylammonium hydroxide (TPAOH) of Chemical Formula 5.

[Chemical Formula 4]

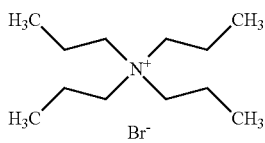

[Chemical Formula 5]

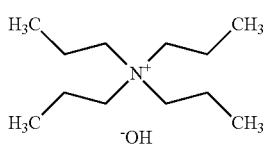

More preferably, the above salt compound may be a mixture of cetrimonium bromide (CTAB) and tetrapropylammonium hydroxide (TPAOH).

In the present invention, mixing may be performed at a temperature of 25 to 80° C. for 16 to 20 hours. In the case in which mixing is performed within the above temperature and time ranges, the swelling effect is achieved.

In the present invention, drying may be performed at a temperature of 50 to 110° C. for 10 to 24 hours.

In the present invention, calcination may be performed at a temperature of 400 to 700° C. for 1 to 40 hours. In the case in which calcination is performed within the above temperature and time ranges, the swelling agent is removed, and therefore the zeolite nanosheet preparation effect is achieved.

In the present invention, the multilayer zeolite precursor may be prepared by adding an organic structure-directing agent. The organic structure-directing agent may be one or more selected from the group consisting of HMI (hexamethyleneimine), piperidine, TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), and TMAdaI (N,N,N-trimethyl adamantylammonium iodide).

In the present invention, the corresponding half-width at half-maximum (HWHM) of a (101) plane of the monolayer zeolite nanosheet shows linear behavior with respect to the reciprocal of the number of nanosheets of the zeolite in the c-direction, or the ratio of the micropore volume of the zeolite shows linear behavior with respect to the reciprocal of the number of nanosheets of the zeolite in the c-direction.

In the present invention, it has been found that a monolayer zeolite nanosheet prepared by the above method is used as a commercial catalyst in an alkylation process, accessibility to products is improved, whereby reaction activity is increased and the lifetime of the catalyst is also increased. Also, it has been found that the monolayer zeolite has a structural characteristic in that a c-direction layer is separated, and a separation membrane having high permeability can be synthesized.

Thus, in another aspect, the present invention relates to a monolayer zeolite nanosheet prepared by the above method, wherein nanosheets having a thickness of 2.0 to 3.0 nm of a layer, are aggregated into one or two layers in a c-direction to compose of three to four layers having a thickness of 2.0 to 14 nm.

In yet another aspect, the present invention relates to a catalyst including the monolayer zeolite nanosheet.

In a further aspect, the present invention relates to an $H_2$ separation method of bringing the monolayer zeolite nanosheet into contact with a mixture containing $H_2$ to separate $H_2$ from the mixture.

The monolayer zeolite nanosheet according to the present invention is used not only for a catalyst but also for separation, collection, or removal of gas including $H_2$.

A monolayer zeolite nanosheet according to an embodiment of the present invention has a well-preserved MWW type structure consisting of 3 to 4 UC nanosheets formed via aggregation of about 1 to 2 UC nanosheets in the c-direction. In particular, rigorous analysis of the structural (XRD) and textural (Ar adsorption) features, along with a selective acid site titration method and NMR spectra, reveals that RT_NS consisted of a well-preserved MWW type zeolite structure with a large number of total Brønsted acid sites. Because RT_NS has high potential as a unique catalyst, RT_NS can be applied to catalytic reactions (starting with methanol-to-hydrocarbon catalysis).

Hereinafter, the present invention will be described in more detail with reference to examples. However, it will be obvious to those skilled in the art that these examples are provided only for illustration of the present invention and should not be construed as limiting the scope of the present invention.

Example

Preparation Example 1: Preparation of MCM-22(P) Monolayer Zeolite Nanosheet

Preparation Example 1-1: Synthesis of MCM-22(P) Particles

MCM-22(P) particles were synthesized according to the reported method (Corma, A. et al. J., Zeolites, 1995, 15, 2-8). In detail, 0.59 g of sodium aluminate (about 55% $Al_2O_3$ and 45% $Na_2O$, Sigma-Aldrich) and 2.0 g of sodium hydroxide (98%, Sigma-Aldrich) were dissolved in 261.3 g of deionized water. After mixing the solution using a stirring bar, 19.9 g of fumed silica (CAB-O-SIL M5, Cabot) was added to the solution. Subsequently, 16.2 g of hexamethyleneimine (HMI, 99%, Sigma-Aldrich) was added dropwise to the mixture while stirring. The final molar composition of the mixture was 100 $SiO_2$: 1.93 $Al^{3+}$: 17.9 Nat: 49.3 HMI: 4,377 $H_2O$. The mixture was further shaken overnight at room temperature. Subsequently, the mixture was transferred to Teflon liners and allowed to react in a Teflon lined stainless-steel autoclave at 408 K for 11 days. The resulting product was recovered by repeated centrifugation and washing with deionized water five times. The recovered product was dried at 70° C., and, for convenience, is referred to as MCM-22(P), where P inside the parentheses indicates that it is the MCM-22 precursor. A portion of the dried MCM-22 (P) was calcined at 823 K for 12 hours at a ramp rate of 1° C./min under 200 mL/min of airflow in a boxed furnace. The calcined particles are denoted MCM-22(C), where C inside the parentheses indicates calcined MCM-22.

Preparation Example 1-2: Post-Treatment of MCM-22(P) Particles

MCM-22(P) was post-treated for structural transformation to the delaminated form. First, MCM-22(P) was swollen at two different temperatures (RT: room temperature and HT: 80° C.) in accordance with the reported studies (Maheshwari, S. et al., J. Am. Chem. Soc., 2008, 130, 1507-1516; Schwanke, A. J. et al., Microporous Mesoporous Mater., 2017, 254, 17-27). The molar composition for the swelling step was identical to those reported in the literature (Corma, A. et al., Nature, 1998, 396, 353-356; Corma, A. et al., J. Catal., 2000, 191, 218-224; Corma, A. et al., J. Catal., 1999, 186, 57-63). Specifically, 3.4 g of cetyltrimethylammonium bromide (CTAB, 99%, Sigma-Aldrich) and 3.7 g of a tetrapropylammonium hydroxide solution (TPAOH, 40 wt %, Alfa Aesar) were added sequentially to 10.8 g of deionized water. After that, about 0.6 g of MCM-22(P) particles was added to the swelling solution. The mixture was stirred for 16 hours at two different temperatures to promote swelling. The swollen MCM-22(P) at 80° C. was further subjected to sonication and acidification. For sonication, a conical tube containing the whole mixture was placed in a bath-type sonicator (UC-10P, JEIO Tech), and the tube was sonicated for 60 min. Subsequently, a certain amount of a hydrochloric acid solution (1 M, Sigma-Aldrich) was added to the sonicated mixture until the pH value reached about 2 (usually, 1.95 to 2.05). The resulting particles were recovered through centrifugation and further dried at 70° C. The dried particles were calcined at 823 K for 12 hours at a temperature increase rate of 1° C./min under 200 mL/min of airflow in a boxed furnace (CRF-M30-UP, Pluskolab). The resulting calcined particles are denoted HT_S_H, where HT indicates the high swelling temperature, S indicates bath type sonication, and H indicates acid addition, respectively. In addition, the swollen MCM-22(P) particles at room temperature were recovered through the above-mentioned procedure, but without sonication or pH adjustment. After the same calcination process, the resulting particles are referred to as RT_NS, where RT indicates room-temperature swelling and NS represents no sonication.

Example 1: Simulation Model and Characterization

Scanning electron microscopy (SEM) images were obtained using a field emission scanning electron microscope (FE-SEM) (Hitachi S-4300). A Pt coating was applied to all samples via ion sputtering (Hitachi E-1030) to obtain SEM images. X-ray diffraction (XRD) patterns were acquired in the θ/2θ configuration using a Rigaku Model D/Max-2500V/PC diffractometer with Cu Kα radiation (40 kV, 100 mA, λ=0.154 nm). Transmission electron microscopy (TEM) images were acquired using a field-emission transmission electron microscope (FE-TEM) (Tecnai $G^2$ F30ST). $N_2$ physisorption data at 77 K and Ar physisorption data at 87 K were acquired using the same instrument (ASAP 2020, Micromeritics, Inc.). Before measurement, the samples were degassed at about 350° C. in a vacuum for at least 12 hours. $^{29}Si$ magic angle spinning nuclear magnetic resonance (MAS NMR) spectra were obtained using an AVANCE III HD 400 (Bruker) NMR spectrometer with a magnetic field of 9.4 T. Each spectrum was recorded 2,700 times at 79.4 MHz with a spinning rate of 6 kHz for $^{29}Si$ MAS NMR, whereas that for $^{27}Al$ MAS NMR was recorded 1,024 times at 104.2 MHz with a spinning rate of 10 kHz. 4,4-Dimethyl-4-silapentane sulfonate sodium (DSS) and $Al(NO_3)_3$ were used as references for the $^{29}Si$ and $^{27}Al$ MAS NMR spectra, respectively. The temperature-programmed desorption of $NH_3$ (referred to as $NH_3$-TPD-MS) was conducted with a BEL-CAT (MicrotracBEL Corp.) and monitored with a BELMass (MicrotracBEL Corp.). After the activation of a sample at 500° C. for 1 hour under the flow of He and cooling to room temperature, the sample was further allowed to adsorb $NH_3$ molecules for 30 minutes under the flow of 5 vol % $NH_3$ gas, with the balance of He, at 30 mL/min. Subsequently, the sample was gradually heated up to 800° C. at a ramp rate of 10° C./min under the flow of He at 30 mL/min. The effluent $NH_3$ from the sample was monitored by mass spectrometry (BELMass). In-situ pyridine adsorption was carried out in a custom-made cell, where ZnSe windows were used for the windows on both sides. Before measurement, the sample was activated at 500° C. for 6 hours at a ramp rate of 3° C./min in a vacuum. After completing the activation process, the reference IR spectra were obtained at 150° C., and subsequently, pyridine vapor (Py) was added, and the sample was left for adsorption for 1 hour; for the Py vapor (partial vapor pressure of 2.08 kPa at 298 K), He was made to flow at 30 mL/min through a Py-containing bubbler. The weakly and physically adsorbed pyridine vapor was removed by applying a vacuum for 1 hour at 150° C. Subsequently, the IR spectra of the Py-adsorbed sample (denoted Py-spectra) were recorded. To examine the BrØnsted acid sites in the non-microporous area (i.e., mesoporous and external surface areas), adsorption experiments with a bulkier pyridine derivative (here, 2,6-di-tertbutylpyridine; dTBPy, partial vapor pressure of 0.034 kPa at 298 K) were carried out by following the same procedure as for the pyridine adsorption experiments. The obtained spectra are labeled the dTBPy-spectra. Finally, the spectra, obtained by subtracting the reference data from the Py-spectra or dTBPy-spectra, were integrated for 1,540-45 cm$^{-1}$ (Py) and 1,615 cm$^{-1}$ (dTBPy) to quantify the total BrØnsted acid sites and the BrØnsted acid sites on the mesoporous and external surface areas, respectively. The extinct coefficients corresponding to wavenumbers of 1,540-45 and 1,615 cm$^{-1}$ were 1.13 (Meloni, D. et al., Appl. Catal. A-Gen., 2001, 215, 55-66) and 5.3 cm·µmol$^{-1}$ (Gora-Marek, K. et al., J. Phys. Chem. C, 2014, 118, 12266-12274), respectively.

Figure 7:
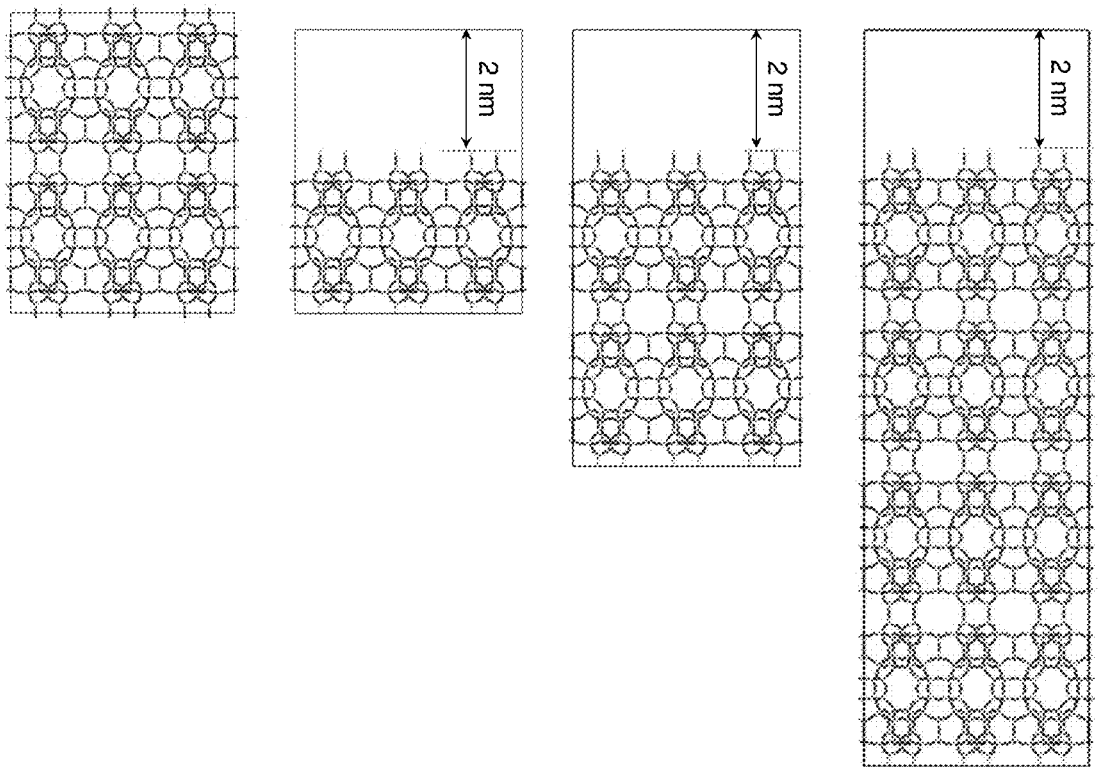
FIG. 7 is a schematic diagram showing structures in which the distances between (a1)-(a3) 1 UC and (b1)-(b3) 2 UC nanosheets are 2, 4, and 10 nm as the result of delamination of an MWW type zeolite according to an embodiment of the present invention.

To investigate the Ar adsorption behavior in the delaminated MWW type zeolite, Ar adsorption isotherms were computed using grand-canonical Monte Carlo (GCMC) simulations at 88 K. Specifically, the GCMC simulations were carried out with 50,000 initializations and 150,000 equilibrium cycles at each pressure ranging from 10$^{-5}$ Pa to 90,000 Pa. The structure of the bulk MWW type zeolite was downloaded from the International Zeolite Association (IZA, http://www.iza-structure.org/databases/), and the original bulk MWW type zeolite structure was modified. In detail, for bulk MWW type zeolite, a 1×1×1 unit cell was repeated in periodic boundary conditions, whereas 1×1×1 and 1×1×2 unit cells with certain distances between the adjacent unit cells along the c-axis were used to describe 1 and 2 unit cells of the MWW type zeolite, respectively. Specifically, unit cell separations of 2, 4, and 10 nm pores were tested. In addition, the surface of the MWW type zeolite was terminated with the (100) surface by cleaving the zeolite in Materials Studio, and the dangling atoms were capped with hydrogen (refer to FIG. 7 in the Supporting Information). Dispersion and repulsion terms were described by the Lennard-Jones potentials. The force field parameters for Si and O atoms were directly adopted from the work of Bai and associates (Bai, P. et al., J. Phys. Chem. C, 2013, 117, 24375-24387), whereas those for Ar atoms were taken from the work of Dubbeldam and associates (Dubbeldam, D. et al., Fluid Phase Equilib., 2007, 261, 152-161). In addition, atoms including the zeolite structures and simulation supercells were assumed to be rigid during the GCMC simulation.

Elucidation of the Delaminated Structure Based on X-Ray Analysis

Figure 2:
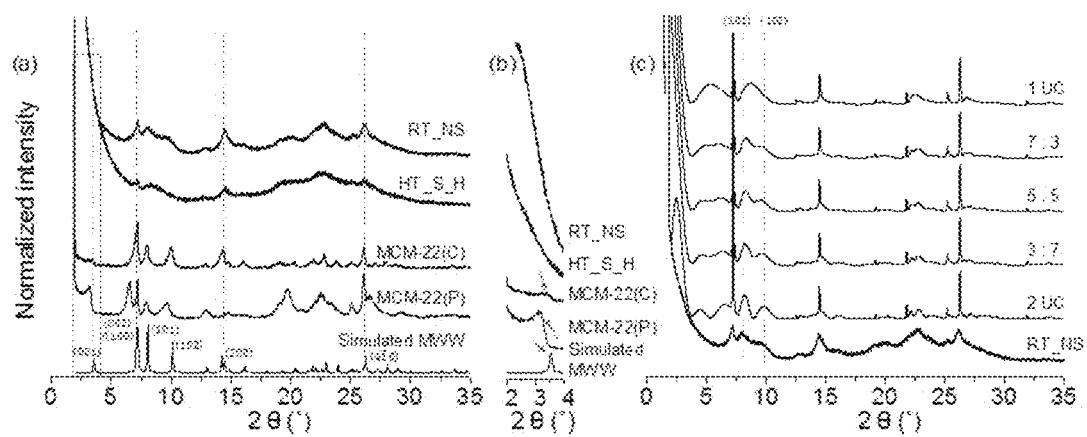
FIG. 2 shows XRD patterns of MCM-22(P), MCM-22(C), RT_NS, and HT_S_H in the ranges of (a) 0 to 35° and (b) 2 to 4°, and (c) XRD patterns of 1 and 2 UC nanosheets simulated through DIFFaX and XRD patterns arbitrarily calculated based on the composition thereof according to an embodiment of the present invention.

FIG. 2(*a*)-(*b*) shows the XRD patterns of MCM-22(C), HT_S_H, and RT_NS along with those of the reference MCM-22(P) and MWW type zeolite, while FIG. 2(*c*) shows the simulated XRD patterns of the MWW type zeolite derivatives prepared by changing the composition of 1 and 2 UC nanosheets along the c-axis. First, the XRD patterns in FIG. 2(*a*)-(*b*) confirm the successful transformation of MCM-22(P) to MCM-22(C) after completing elimination of the organic template by calcination (Lawton, S. et al., Microporous Mesoporous Mater., 1998, 23, 109-117; Corma, A. et al., J. Catal., 1999, 186, 57-63). In addition, the SEM image of MCM-22(C) in FIG. 8 was consistent with those of previously reported studies, showing a morphology having a basal ab-plane (about 1 µm in size) and a short dimension along the c-axis (about 20 to 60 nm) (Maheshwari, S. et al., J. Am. Chem. Soc., 2008, 130, 1507-1516; Frontera, P. et al., Microporous Mesoporous Mater., 2007, 106, 107-114; Jin, F. et al., J. Mater. Chem. A, 2015, 3, 8715-8724). The Si/Al ratio (about 50.7 in Table 1) of MCM-22(C) was comparable to the nominal value of 50 in the synthetic solution.

TABLE 1

Si/Al ratio estimated from measurement of SEM-EDX of MCM-22(C), HT_S_H, and RT_NS.

| Sample | Si/Al ratio$^a$ |
|---|---|
| MCM-22(C) | 50.7 ± 6.7 |
| HT_S_H | 37.4 ± 6.1 |
| RT_NS | 34.2 ± 4.8 |

$^a$EDX data were obtained by averaging data obtained from 6 particles and calculating the standard deviation value thereof.

Figure 9:
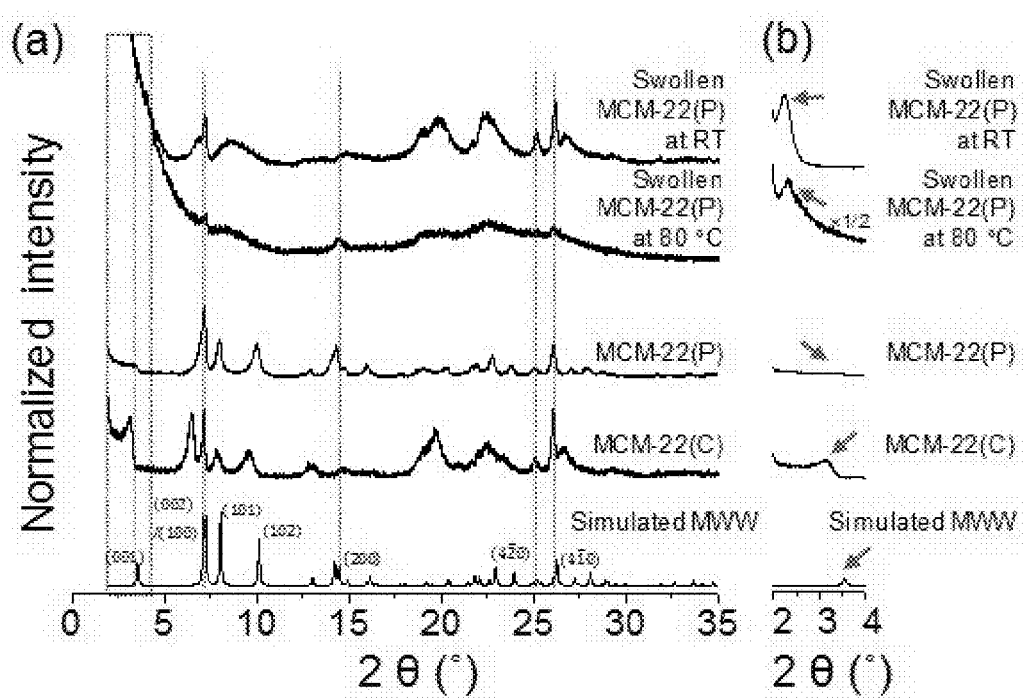
FIG. 9 shows XRD patterns of MCM-22(P) and MCM-22(C) in the ranges of (a) 0 to 35° and (b) 2 to 4° and MCM-22 after an inter-layer swelling process at 80° C. and room temperature according to an embodiment of the present invention.
Figure 10:
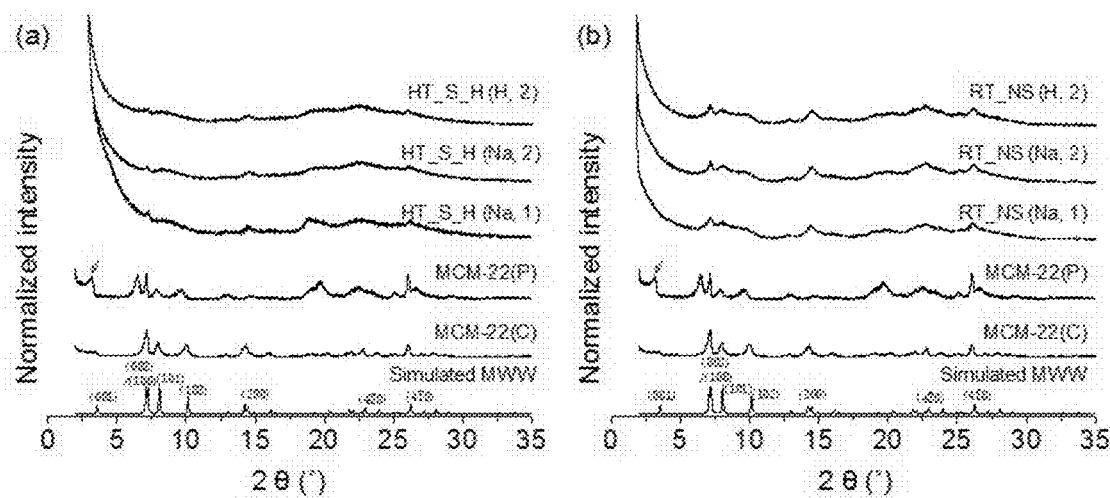
FIG. 10 shows XRD patterns of (a) HT_S_H (x, y) and (b) RT_NS (x, y) according to an embodiment of the present invention.

Compared to MCM-22(C), both HT_S_H and RT_NS had some features in common; (1) broader XRD patterns, (2) decreased XRD intensities, and (3) lower signal-to-noise (S/N) ratios. These features indicate that the original MCM-22(P) particles became smaller or suffered from structural damage/collapse after the post-treatment processes (Corma, A. et al., Nature, 1998, 396, 353-356; Corma, A. et al., J. Catal., 1999, 186, 57-63; Frontera, P. et al., Microporous Mesoporous Mater., 2007, 106, 107-114). The morphological changes of HT_S_H and RT_NS compared to MCM-22 (C) (FIG. 8) also indicate structural damage/collapse. Along with the morphological changes, the original Si/Al ratio of MCM-22(C) was decreased after post-treatment, as for HT_S_H and RT_NS (Table 1). This trend is comparable to that observed in previous studies (Frontera, P. et al., Microporous Mesoporous Mater., 2007, 106, 107-114) and can be ascribed to desilication caused by the basicity of the swelling solution (Maheshwari, S. et al., J. Am. Chem. Soc., 2008, 130, 1507-1516; Ogino, I. et al., J. Am. Chem. Soc., 2011, 133, 3288-3291). The disappearance of the XRD peaks corresponding to the (001) planes and remaining XRD peaks corresponding to the (hk0) planes (e.g. (100) and (410) planes located at about 7.2° and 26°, respectively) were observed for both HT_S_H and RT_NS, which are typical XRD features reported in the literature for these materials (FIG. 2(*a*)) (Corma, A. et al., Nature, 1998, 396, 353-356; Corma, A. et al., J. Catal., 2000, 191, 218-224; Frontera, P. et al., Microporous Mesoporous Mater., 2007, 106, 107-114). Despite the similarities in the XRD patterns of HT_S_H and RT_NS, it was noted that the intensities of the (100) and (410) planes were more pronounced for RT_NS, suggesting greater structural integrity. The morphological differences of HT_S_H and RT_NS were consistent with the differences in structural integrity determined from the XRD patterns. The particles of HT_S_H had rounded edges and some smaller, poorly defined particles were observed, (indicated by dark yellow arrows in FIG. 8(*b*)). This superior structural integrity in RT_NS can be attributed to the mild conditions used for swelling because swelling at 80° C. resulted in a pronounced decrease in the XRD peak intensities, along with a concomitant decrease in the S/N ratio (FIG. 9). Despite successful swelling up to about 1.4 nm of the inter-layer spacing after treatment at 80° C., as estimated from FIG. 9, the original MWW structure underwent a severe degree of collapse or increase in disorder, whereas the swelling at ambient temperature helped to maintain the MWW type zeolite structure (Maheshwari, S. et al., J. Am. Chem. Soc., 2008, 130, 1507-1516; Schwanke, A. J. et al., Microporous Mesoporous Mater., 2017, 254, 17-27). In addition, the preservation of the lamellar structures in the MWW type zeolite can be evaluated by interpreting the XRD patterns, especially in the range of 8 to 10°, as demonstrated for the elucidation of the degree of condensation in 2D lamellar zeolites. One broad peak around 8 to 10° appeared in the XRD pattern of HT_S_H (FIG. 2(*a*)), implying that the intermediate layers in the MWW zeolite were significantly disordered with respect to the c-axis, consistent with an interpretation in a previous study (Roth, W. J. et al., Microporous Mesoporous Mater., 2011, 142, 32-36). However, for RT_NS, the two distinct XRD peaks around about 8.0° and 9.8°, which reflect the (101) and (102) planes, respectively, suggest an ordered structure along the c-axis, which was consistent with MCM-56, which exhibited a disordered collection of monolayers (Wang, L. L. et al., Microporous Mesoporous Mater., 2008, 113, 435-444; Polozij, M. et al., Dalton Trans., 2014, 43, 10443-10450; Juttu, G. G. et al., Microporous Mesoporous Mater., 2000, 40, 9-23). The curled shape of the RT_NS particles (indicated by orange arrows in FIG. 8(c)), in contrast with to the sharp edges of the MCM-22(C) particles, has also been previously observed for nanometer-thick MCM-22 lamellae (Varoon, K. et al., Science, 2011, 334, 72-75). The post-treatment processes for HT_S_H and RT_NS were highly reproducible, and the corresponding crystal structures were well maintained after completing proton exchange (FIG. 10).

Figure 11:
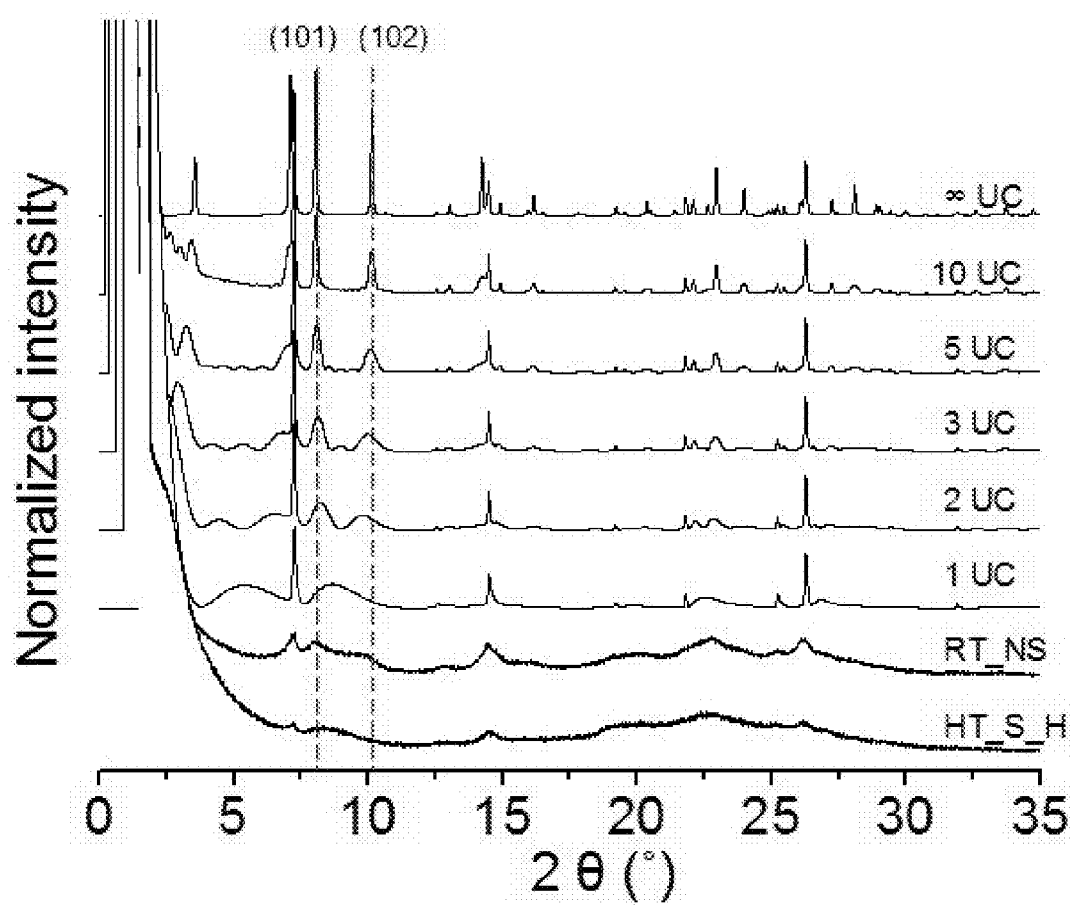
FIG. 11 shows simulated XRD patterns when a DIFFaX-based layered MWW type zeolite exhibits 1, 2, 3, 5, 10, and ∞ UC sheet structures according to an embodiment of the present invention.

To investigate the structure of HT_S_H and RT_NS in a rigorous way, the simulated XRD patterns shown in FIG. 2 and those of the MWW type zeolite derivatives with varied stacking numbers of the UC nanosheets along the c-axis were used (FIG. 11). The simulated XRD patterns were obtained in accordance with previously reported methods (Varoon, K. et al., Science, 2011, 334, 72-75; Juttu, G. G. et al., Microporous Mesoporous Mater., 2000, 40, 9-23; Treacy, M. M. J. et al., Phys. Sci., 1991, 433, 499-520). It was noticed that among the many XRD peaks, two XRD peaks at 8 to 10° arising from the (101) and (102) planes can be used to judge how many UC nanosheets or intermediate layers constitute the post-treated MCM-22 particles. In short, as the number of UC nanosheets decreased, the two peaks broadened and became closer to each other (FIG. 11). Eventually, the two peaks merged into a broad peak in the XRD pattern of the 1 UC nanosheet. Thus, it appears that HT_S_H mainly consisted of 1 UC nanosheets, although the corresponding intensity of the broad XRD peak was not pronounced (Varoon, K. et al., Science, 2011, 334, 72-75). In contrast, a comparison of the two distinguishable XRD patterns in RT_NS with the simulated XRD patterns in FIG. 11 reveals that RT_NS was likely composed of 1 and/or 2 UC nanosheets. Specifically, a series of simulated XRD patterns with respect to the different weight portions of 1 and 2 UC nanosheets in FIG. 2(c) suggests that the structure of RT_NS consisted of about 70% 1 UC nanosheets and about 30% 2 UC nanosheets.

Figure 3:
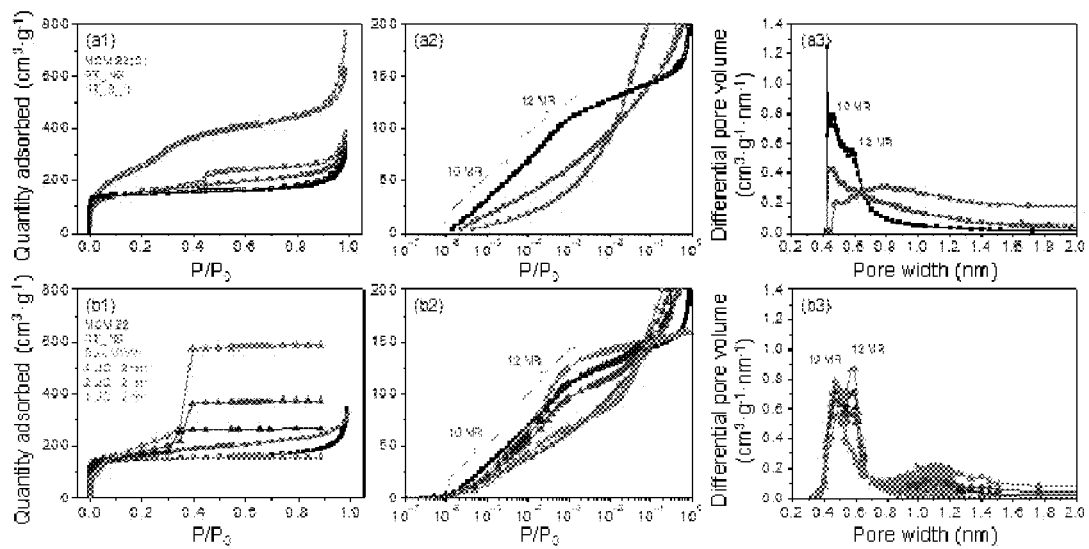
FIG. 3 shows (a1)-(a2) experimental Ar physisorption isotherms at 87 K of MCM-22(C), RT_NS, and HT_S_H obtained through experimentation and (b1)-(b2) large sizes and hierarchical structures thereof according to an embodiment of the present invention.

Example 2: Elucidation of the Delaminated Structure Based on Textural Properties Along with the bulk-scale structural information from XRD analyses, the Ar adsorption isotherms of all three particles were measured to understand the textural properties thereof at the bulk scale (FIG. 3(a1)-(a3)). In addition, the simulated Ar adsorption isotherms in several domains for MWW type zeolite and the derivatives thereof (FIG. 7) were obtained (FIG. 3(b1)-(b2)) and the resulting micropore distribution is shown in FIG. 3(b3). It was noticed that on the linear scale, the Ar and $N_2$ isotherms of MCM-22(C), HT_S_H, and RT_NS were comparable to each other for all cases (FIGS. 3(a1) and 12(a1)-(b1)), indicating negligible differences in the interaction of the probe molecules with the particle samples. First, the mother material, MCM-22(C), showed the typical adsorption behavior of a microporous material (FIGS. 3(a1) and 12(a1)-(b1)). In addition, the adsorption isotherms on a semi-log scale were plotted in an effort to determine the microporous region more precisely. Indeed, FIG. 3(a2) supports the use of the inert Ar probe molecule, rather than $N_2$ (FIG. 12(a2)), for identifying the microporous features clearly. FIG. 3(a2) shows that the adsorbed amount gradually and almost exponentially (linearly on the log scale) increased in the 10 MR-pore region (in the range of $10^{-6}$ to $10^{-4}$ of relative pressure ($P/P_0$)) and further increased in the 12 MR pore region (in the range of $10^{-4}$ to $10^{-2}$ of $P/P_0$) (Corma et al., J. Catal., 2000, 191 (1), 218-224, Corma et al. Microporous Mesoporous Mater. 1998, 25 (1-3), 207-224, Corma et al., Microporous Mesoporous Mater, 2000, 38 (2-3), 301-309). In fact, the Horvath-Kawazoe (H-K) micropore analysis method revealed two pronounced pore diameters of about 0.5 and 0.6 nm, which apparently correspond to the 10 and 12 MR pores, respectively (FIG. 3(a3)). In particular, the amounts of micropores belonging to the 10 and 12 MR pores were obtained, as listed in Table 2 (0.116 $cm^3 \cdot g^{-1}$), by deconvoluting the H-K micropore curve (FIG. 13(a)). Detailed information about the micropores corresponding to the 10 and 12 MR pores is given in FIG. 13.

TABLE 2

Textural properties of MCM-22(C), HT_S_H, and RT_NS obtained from analysis of Ar physisorption isotherms thereof.

| Adsorbate | Sample | Si/Al ratio[a] | $S_{BET}$ ($m^2 \cdot g^{-1}$) | $S_{ex}$[b] ($m^2 \cdot g^{-1}$) | $S_{ex}$ (%, vs. MCM-22) | $S_{meso}$ ($m^2 \cdot g^{-1}$) t-plot[b] | BJH[c] | $S_{micro}$[b] ($m^2 \cdot g^{-1}$) | $S_{micro}$ (%, vs. MCM-22) | $V_{micro}$[b] ($cm^3 \cdot g^{-1}$) H-K t-plot 10 MR + 12 MR | $V_{micro}$ (%, vs. MCM-22)[d] |
|---|---|---|---|---|---|---|---|---|---|---|---|
| $N_2$ | MCM-22(C) | 50 (50.7) | 576 | 82 | 100 | — | | 494 | 100 | 0.18 | 100 |
| | HT_S_H | 50 (37.4) | 880 | 398 | 485 | 371 | 534 | 110 | 22 | 0.02 | 11 |
| | RT_NS | 50 (34.2) | 579 | 278 | 339 | 35 | 80 | 266 | 54 | 0.11 | 61 |
| Ar | MCM-22(C) | 50 (50.7) | 500.1 | 149.6 | 100 | — | — | 350.5 | 100 | 0.17 0.116 | 100 |
| | HT_S_H | 50 (37.4) | 818.5 | 329.2 | 220 | | 633 | 489.3 | 140 | 0.02 0.001 | 0.9 |

TABLE 2-continued

Textural properties of MCM-22(C), HT_S_H, and RT_NS obtained from analysis of Ar physisorption isotherms thereof.

| Adsorbate | Sample | Si/Al ratio[a] | $S_{BET}$ (m²·g⁻¹) | $S_{ex}$[b] (m²·g⁻¹) | $S_{ex}$ (%, vs. MCM-22) | $S_{meso}$ (m²·g⁻¹) t-plot[b] | $S_{meso}$ (m²·g⁻¹) BJH[c] | $S_{micro}$[b] (m²·g⁻¹) | $S_{micro}$ (%, vs. MCM-22) | $V_{micro}$[b] (cm³·g⁻¹) t-plot | $V_{micro}$[b] (cm³·g⁻¹) H-K 10 MR + 12 MR | $V_{micro}$ (%, vs. MCM-22)[d] |
|---|---|---|---|---|---|---|---|---|---|---|---|---|
| | RT_NS | 50 (34.2) | 510.2 | 276.2 | 185 | | 124 | 234.0 | 67 | 0.07 | 0.062 | 53 |

Notation: $S_{BET}$, Brunauer-Emmett-Teller (BET) surface area; $S_{ex}$, external surface area; $S_{meso}$, mesoporous surface area; $S_{micro}$, microporous surface area; $V_{micro}$, micropore volume; $V_{total}$, total pore volume; $V_{meso}$, mesopore volume; —, not available
[a]obtained from nominal values and actual values in parenthesis.
[b]calculated using a modified t-plot method and the conventional t-plot method for N₂ and Ar adsorption isotherms, respectively. Of these two, the results based on the former method are more reliable and adopted for comparison in the present invention.
[c]calculated using the BJH method in the range of 2-50 nm.
[d]obtained by calculating the numerical values obtained via the t-plot method for N₂ adsorption isotherms and the H-K method for Ar adsorption isotherms.

Figure 12:
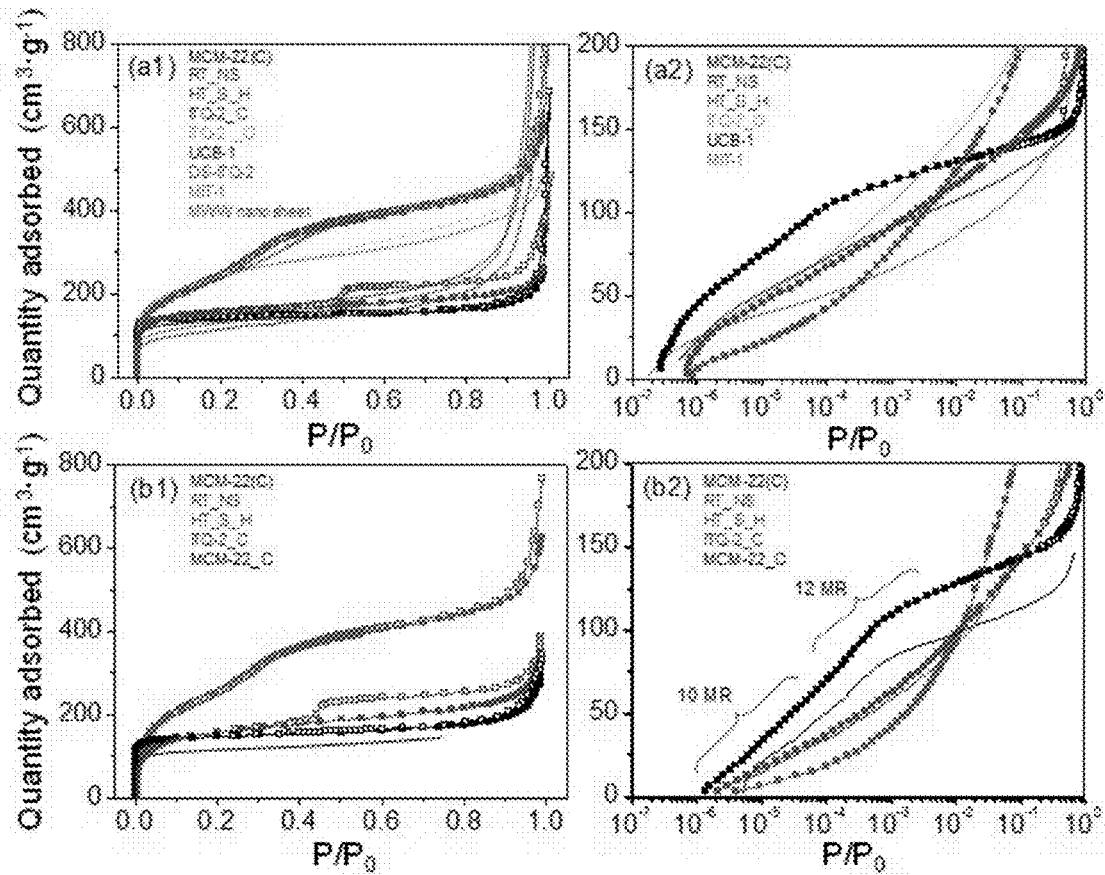
FIG. 12 shows (a1)-(a2) Ar physisorption isotherms at 87 K of MCM-22(C), RT_NS, and HT_S_H and (b1)-(b2) $N_2$ physisorption isotherms at 77 K of MCM-22(C), RT_NS, and HT_S_H according to an embodiment of the present invention.
Figure 13:
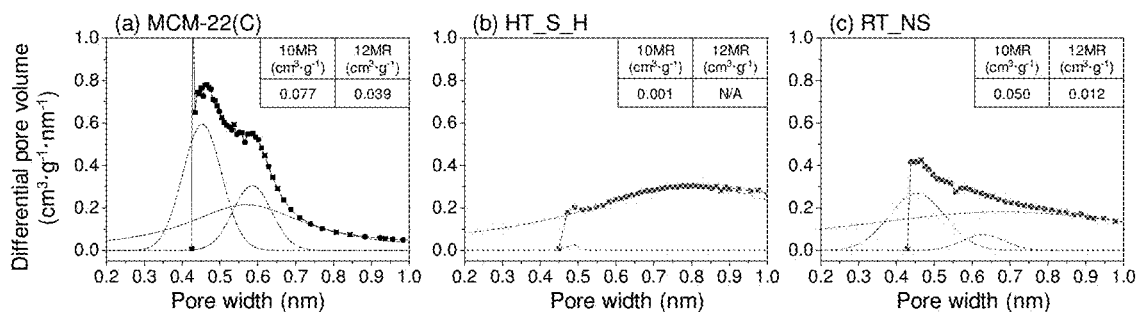
FIG. 13 shows deconvolution of pore distribution obtained from Ar physisorption isotherms of MCM-22(C), HT_S_H, and RT_NS according to an embodiment of the present invention.
Figure 14:
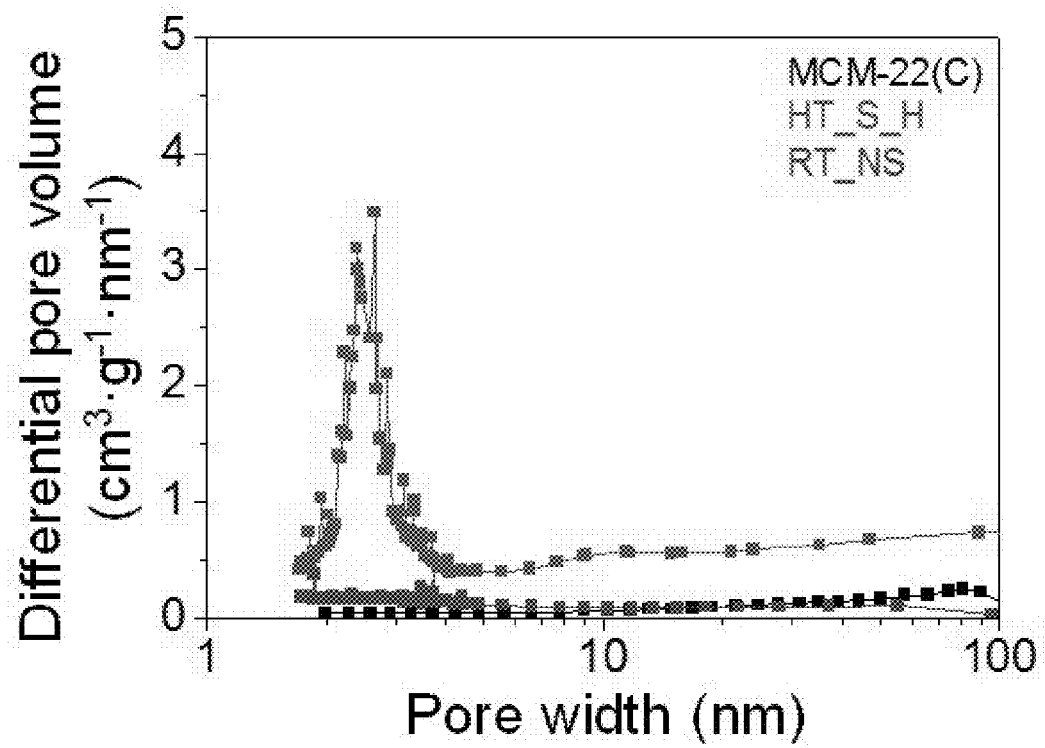
FIG. 14 shows pore distribution obtained from Ar physisorption isotherms at 87 K of MCM-22(C), HT_S_H, and RT_NS according to an embodiment of the present invention.
Figure 15:
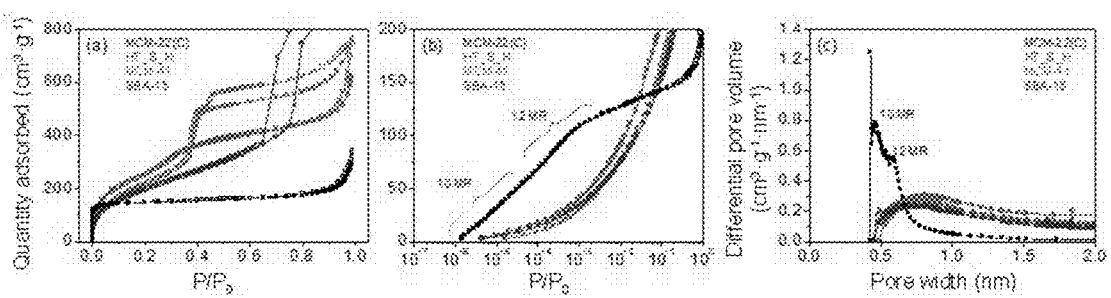
FIG. 15 shows Ar physisorption isotherms at 87 K of MCM-22(C), HT_S_H, MCM-41, and SBA-15 according to an embodiment of the present invention.

In addition, the isotherm of HT_S_H shown in FIG. 3(a1) resembled an adsorption isotherm of a mesoporous material, and was comparable to those reported in previous studies, as shown in FIG. 12(a1). Notably, there was a sharp increase in the range of about 0.2 to 0.5 in P/P₀, regardless of the probe molecule (FIGS. 3(a1) and 12(a1)). This indicates that a large amount of mesopores was generated by the delamination process. Indeed, this increase in the Ar adsorption isotherm (FIG. 3(a1)) reflects the high mesoporosity in the range of about 2 to 4 nm (FIG. 14). However, the amount of adsorbed Ar at low values of P/P₀ (below $10^{-3}$), which correspond to micropores (specifically, the 10 MR-pore regime in MCM-22(C)), drastically decreased compared to that of MCM-22(C) (FIG. 3(a2)). A rapid increase was observed above P/P₀ of $10^{-3}$ in the adsorption branch, which corroborated the N₂ physisorption data for ITQ-2_O (ITQ-2 prepared by Ogino and associates), as shown in FIG. 12(a2) (Ogino, I. et al., J. Am. Chem. Soc., 2011, 133, 3288-3291). This rapid increase in the isotherm was attributable to the unavoidable formation of amorphous silica because of desilication in the highly basic medium (pH 13.5) during the swelling process (Ogino, I. et al., J. Am. Chem. Soc., 2011, 133, 3288-3291). The decreased amount of adsorbed Ar at low P/P₀ was clearly a reflection of the decreased microporosity, whereas the number of the unclarified micropores in the range of 0.7 to 2.0 nm increased. Further, the rapid increase above P/P₀ of $10^{-3}$ and the change in the micropores for HT_S_H were similar to those for MCM-41 and SBA-15, which are representative of mesoporous silica (FIG. 15). Based on the pore size distribution of MCM-41 and SBA-15 (FIG. 15(c)), it is reasonable to consider the unclarified micropores in HT_S_H as amorphous siliabout. A quantitative analysis based on the N₂ adsorption isotherms, estimated using a modified t-plot (Galarneau, A. et al., Langmuir, 2014, 30, 13266-13274), indicates that the microporous surface area and volume were reduced to about 22% and 11% of MCM-22(C), respectively (Table 2). Specifically, the H-K method based on the Ar adsorption isotherms reveals that the micropores corresponding to the zeolitic pores were decreased to about 0.7% (0.001 cm³·g⁻¹, in Table 2 and FIG. 13(b)). Instead, the mesoporous and external surface areas increased enormously, accounting for the most part of the total surface area. It appears that these increases in the mesoporous and external surface area resulted from newly formed amorphous silica whose Ar adsorption isotherm significantly increased, as mentioned above (FIG. 3(a1)). The detailed results for HT_S_H and a comparison with the previous results are given in Table 3.

TABLE 3

Textural properties of MCM-22(C), HT_S_H, and RT_NS obtained from N₂ physisorption isotherms thereof.

| Sample | Si/Al ratio[a] | $S_{BET}$ (m²·g⁻¹) | $S_{ex}$[b] (m²·g⁻¹) | $S_{ex}$ (%,vs. MCM-22) | $S_{meso}$ (m²·g⁻¹) t-plot[b] | $S_{meso}$ (m²·g⁻¹) BJH[c] | $S_{micro}$[d] (m²·g⁻¹) | $S_{micro}$ (%, vs. MCM-22) | $V_{total}$[e] (cm³·g⁻¹) | $V_{micro}$[b] (cm³·g⁻¹) | $V_{micro}$ (% vs. MCM-22) | $V_{meso}$[b] (cm³·g⁻¹) | Reference literature |
|---|---|---|---|---|---|---|---|---|---|---|---|---|---|
| MCM-22(C) | 50 (50.7) | 576 | 82 | 100 | | | 494 | 100 | 0.53 | 0.18 | 100 | — | Present invention |
| HT_S_H | 50 (37.4) | 880 | 398 | 485 | 371 | 534 | 110 | 22 | 1.22 | 0.02 | 11 | 0.65 | Present invention |
| RT_NS | 50 (34.2) | 579 | 278 | 339 | 35 | 80 | 266 | 54 | 0.55 | 0.11 | 61 | 0.17 | Present invention |
| MCM-22 | 50(—) | 398 | — | — | — | — | — | — | — | 0.14 | — | — | Corma et al. |
| ITQ-2_C | 50(—) | 840 | 790 | — | — | — | 50 | — | — | — | — | — | Corma et al. |
| Delaminated MWW nanosheet | ∞ (∞) | 368 | — | — | — | — | — | — | — | 0.05 | 36 | — | Varoon et al. |

TABLE 3-continued

Textural properties of MCM-22(C), HT_S_H, and RT_NS obtained from N$_2$ physisorption isotherms thereof.

| Sample | Si/Al ratio[a] | $S_{BET}$ (m$^2$·g$^{-1}$) | $S_{ex}^b$ (m$^2$·g$^{-1}$) | $S_{ex}$ (%, vs. MCM-22) | $S_{meso}$ (m$^2$·g$^{-1}$) t-plot[b] BJH[c] | $S_{micro}^d$ (m$^2$·g$^{-1}$) | $S_{micro}$ (%, vs. MCM-22) | $V_{total}^e$ (cm$^3$·g$^{-1}$) | $V_{micro}^b$ (cm$^3$·g$^{-1}$) | $V_{micro}$ (% vs. MCM-22) | $V_{meso}^b$ (cm$^3$·g$^{-1}$) | Reference literature |
|---|---|---|---|---|---|---|---|---|---|---|---|---|
| DS-ITQ-2 | 15(-) | 545 | 304 | — | — — | 241 | — | 2.06 | 0.12 | 71 | 0.41 | Margarit et al. |
| MIT-1 | 20 (16) | 513 | 321 | — | — — | — | — | 1.014 | 0.131 | 92 | — | Luo et al. |

Notation: $S_{BET}$, Brunauer-Emmett-Teller (BET) surface area; $S_{ex}$, external surface area; $S_{meso}$, mesoporous surface area; $S_{micro}$, microporous surface area; $V_{micro}$, micropore volume; $V_{total}$, total pore volume; $V_{meso}$, mesopore volume; —, not available
[a]obtained from nominal values and actual values in parenthesis.
[b]value obtained from the modified t-plot.
[c]value calculated using the BJH method in the range of 2-50 nm.
[d]The microporous surface area is the value obtained by subtracting the external surface area and the mesoporous surface area from the BET surface area.
[e]value calculated from P/P0 ≈ 0.99.
*Corma, A. et al., Nature, 1998, 396, 353-356.
*Varoon, K. et al., Science, 2011, 334, 72-75.
*Margarit, V. J. et al., Angew. Chem.-Int. Edit., 2015, 54, 13724-13728.
*Luo, H. Y. et al., Chem. Sci., 2015, 6, 6320-6324.

Compared to the other two samples, RT_NS had Ar and N$_2$ adsorption isotherms similar to those of MCM-22(C), with a minor difference being the slight increase in adsorption in the non-microporous region (FIGS. 3(a1) and 12(a1)-(b1)). Notably, adsorption/desorption hysteresis was observed for RT_NS, suggesting the formation of mesoporosity. Nevertheless, the quantitative analysis thereof requires much care; that is, a sudden termination of the hysteresis occurred due to the well-known tensile strength effect (TSE) (Groen, J. C. et al., J. Phys. Chem. B, 2004, 108, 13062-13065). Compared to the noticeable increase in adsorption from a P/P$_0$ of 10$^{-3}$ for HT_S_H, RT_NS showed only a gradual increase (FIG. 3(a2)). At low P/P$_0$ (up to about 10$^{-2}$), the amount of adsorbed Ar in RT_NS was smaller than that of MCM-22(C), indicating some degree of micropore reduction (FIG. 3(a2)). Notably, this adsorbed amount was still higher than that of HT_S_H, indicating that a greater portion of micropores were preserved in RT_NS (FIG. 3(a3)). The micropore analysis in FIG. 3(a3) clearly reveals that the microporosity of RT_NS lied between those of MCM-22(C) and HT_S_H. Unlike HT_S_H, RT_NS did not contain micropores larger than about 0.7 nm with a monotonic decrease toward the mesoporous regime (FIG. 3(a3)). In addition, no additional pronounced mesoporosity was observed for RT_NS (FIG. 14), as expected from the slight increase in the Ar adsorption branch (FIG. 3(a1)). The N$_2$-adsorption-based t-plot method allowed the present inventors to obtain the following quantitative information: about 54% of the micropore surface area remained in RT_NS compared to about 22% of that in HT_S_H, whereas the mesoporosity in RT_NS was much lower than that of HT_S_H (Table 2). The decreased microporous surface area in RT_NS was compensated for by the increased external surface area, resulting in a total surface area similar to that of MCM-22(C). Similarly, the N$_2$-adsorption-based micropore volume in RT_NS was retained by up to about 61% of the original microporous volume in MCM-22(C), and the mesoporous volume was decreased, resulting in a similar total pore volume (Tables 2 and 4). In particular, the Ar-adsorption-based micropores resulting from the zeolitic pores (10- and 12-MR pores) were reduced to about 53% (0.062 cm$^3$·g$^{-1}$, in Table 2 and FIG. 13(c)). Notably, the remaining portion of the microporous area and volume in RT_NS were comparable to those of an MWW type zeolite monolayer (so-called DS-ITQ-2, where DS indicates direct synthesis) (Margarit, V. J. et al., Angew. Chem.-Int. Edit., 2015, 54, 13724-13728). Specifically, DS-ITQ-2 has been reported to comprise mainly 1-UC nanosheets (34%) and 2-UC nanosheets (36%) (Margarit, V. J. et al., Angew. Chem.-Int. Edit., 2015, 54, 13724-13728).

TABLE 4

Concentration of Brønsted acid sites in proton-exchanged MCM-22(C), HT_S_H, and RT_NS measured by pyridine (Py) and 2,6-di-tert-butylpyridine (dTBPy) adsorption.

| Sample | PyH$^+$ (μmol/g) | dTBPyH$^+$ (μmol/g) | dTBPyH$^+$/PyH$^+$ | External + mesoporous surface area/BET surface area |
|---|---|---|---|---|
| MCM-22(C) | 270 | 41 | 0.15 | 0.14 |
| HT_S_H | 141 | 109 | 0.77 | 0.87 |
| RT_NS | 176 | 108 | 0.61 | 0.54 |

The ratio of the amount of dTBPyH$^+$ to that of PyH$^+$ indicates the number of B acid sites on the external+mesoporous area relative to that of the total B acid sites. For comparison, the ratio of external and mesoporous surface area to the BET surface area, obtained from the N$_2$ physisorption measurements, is included.

The similarity of the microporous structures of RT_NS and DS-ITQ-2 suggests that the layers of RT_NS were likely a combination of 1 and 2 UC nanosheets (Table 3). Referring to the N$_2$ physisorption results of many MWW derivative materials, it was also found that RT_NS showed N$_2$ adsorption isotherm behavior comparable to those of DS-ITQ-2 and other delaminated MWW type materials (FIG. 12(a1)), except HT_S_H, which showed greater N$_2$ adsorption. Finally, it is to be noted that the preparation of HT_S_H and RT_NS in the present invention was highly reproducible (Table 5).

TABLE 5

Textural properties of MCM-22(C), HT_S_H, and RT_NS obtained from Ar physisorption isotherms thereof.

| Sample | Adsorbate | $S_{BET}$ (m²·g⁻¹) | $S_{micro+meso}$[a] (m²·g⁻¹) | $S_{ex}$[a] (m²·g⁻¹) | $S_{ex}$ (%, vs. MCM-22) | $V_{micro}$[a] (cm³·g⁻¹) | $V_{micro}$ (%, vs. MCM-22) | $V_{micro}$[b] (cm³·g⁻¹) |
|---|---|---|---|---|---|---|---|---|
| MCM-22(C) | Ar | 500.1 | 350.5 | 149.6 | 100 | 0.17 | 100 | 0.17 |
| HT_S_H | Ar | 818.5 | 489.3 | 329.2 | 220 | 0.02 | 12 | 0.15 |
| RT_NS | Ar | 510.2 | 234.0 | 276.2 | 185 | 0.07 | 44 | 0.14 |
| HT_S_H-2 | Ar | 808.7 | 403.7 | 404.0 | 270 | 0.03 | 17 | 0.16 |
| RT_NS-2 | Ar | 502.9 | 223.8 | 279.1 | 187 | 0.07 | 41 | 0.12 |

In order to confirm the reproducibility of the delamination process, Ar physisorption isotherms of HT_S_H and RT_NS, obtained through other experiments, were further obtained. Data obtained at this time are denoted by HT_S_H-2 and RT_NS-2.
Notation: $S_{BET}$, BET surface area; $S_{ex}$, external surface area; $S_{micro}$, microporous surface area; $V_{micro}$, micropore volume
[a]calculated using the t-plot method.
[b]calculated using the H-K method.

Figure 16:
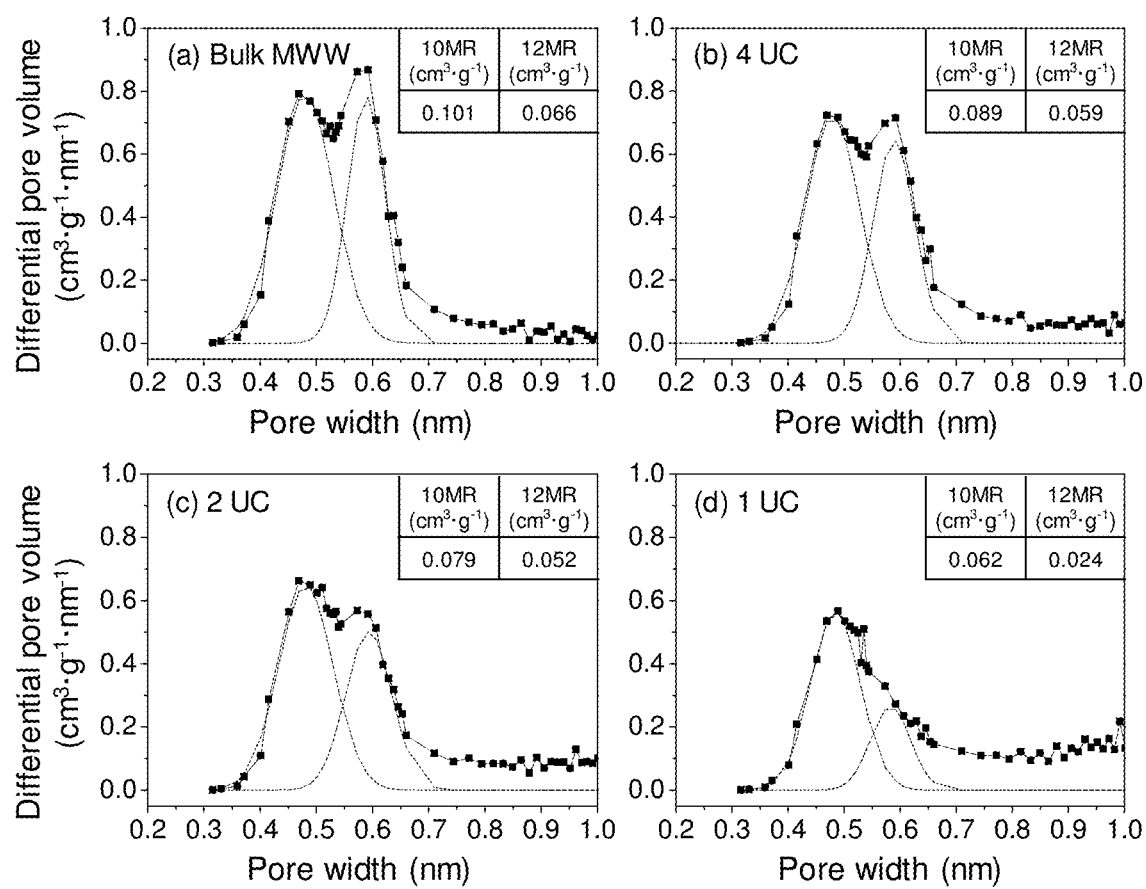
FIG. 16 shows deconvolution values of pore distribution calculated from Ar physisorption isotherms obtained through GCMC simulation according to an embodiment of the present invention.
Figure 17:
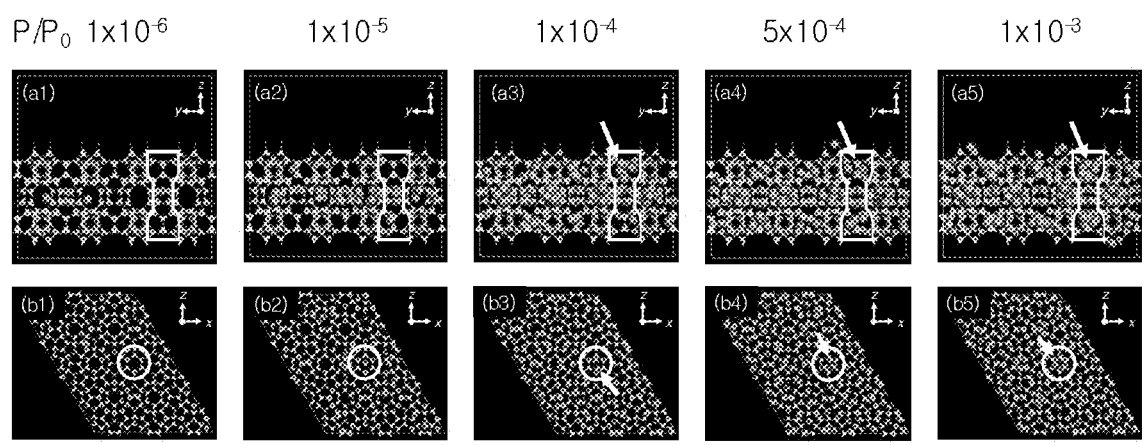
FIG. 17 shows Ar physisorption snapshots obtained through simulation when a monolayer MWW type zeolite according to an embodiment of the present invention has a spacing of 10 nm.

The simulated Ar adsorption isotherm for the bulk MWW zeolite in FIG. 3(b1) shows behavior typical for a pure microporous material and corroborates the experimental result obtained for MCM-22(C), indicating the suitability of the chosen force field (FIG. 3(b1)-(b2)). FIG. 3(b3) reveals that the pore size distribution obtained using the simulated Ar adsorption also showed two distinct peaks at about 0.5 and 0.6 nm, which correspond to the 10 and 12 MR pores in the MWW type zeolite, respectively. This distribution corroborated that experimentally obtained from MCM-22(C) (FIG. 3(a3)). Furthermore, the amounts of micropores corresponding to 10 and 12 MR pores in MCM-22(C) were estimated based on the deconvoluted curves, as summarized in FIG. 16. As inferred from the amount of adsorbed Ar around the 12 MR pore aperture (FIG. 3(b1)-(b2)), the corresponding peak area monotonically decreased with decreasing number of UC nanosheets (FIGS. 3(b3) and 16). Although this decreasing trend was not pronounced for the 10 MR apertures, the corresponding areas also gradually decreased with decreasing number of UC nanosheets (FIGS. 3(b3) and 16). Specifically, it appears that the 1 UC nanosheets primarily contained the 10 MR pores, though some 12 MR pores were still present (FIG. 16(d)). Thus, the major contribution of the 12 MR pores can be ascribed to the 12 MR cups exposed on the external surface, because snapshots of adsorption at various P/P₀ values clearly show the adsorbed Ar molecules (FIG. 17). A comparison of the simulated pore size distribution (FIGS. 3(b3) and 16) with the experimental result in FIG. 2a3 suggests that the number of 10-MR pores in RT_NS was definitely reduced, whereas the 12 MR pores likely disappeared. Interestingly, the ratio of the micropore volume of the 10 and 12 MR pores in the 1 UC nanosheet to those in the bulk MWW zeolite was estimated to be about 61% and 36%, which is similar to that of its counterpart of RT_NS and MCM-22(C) (about 65% and 31%) (FIG. 3(a3) and FIG. 13). These comparable degrees of micropore volume reduction indicate that RT_NS primarily included 1 UC nanosheets. In contrast, HT_S_H lost most of the original micropores, and the portion of 10 MR pores was as low as about 1% with respect to the original MCM-22(C) (FIG. 13 and Table 2).

Example 3: Morphological Determination of Delaminated Particles

Figure 4:
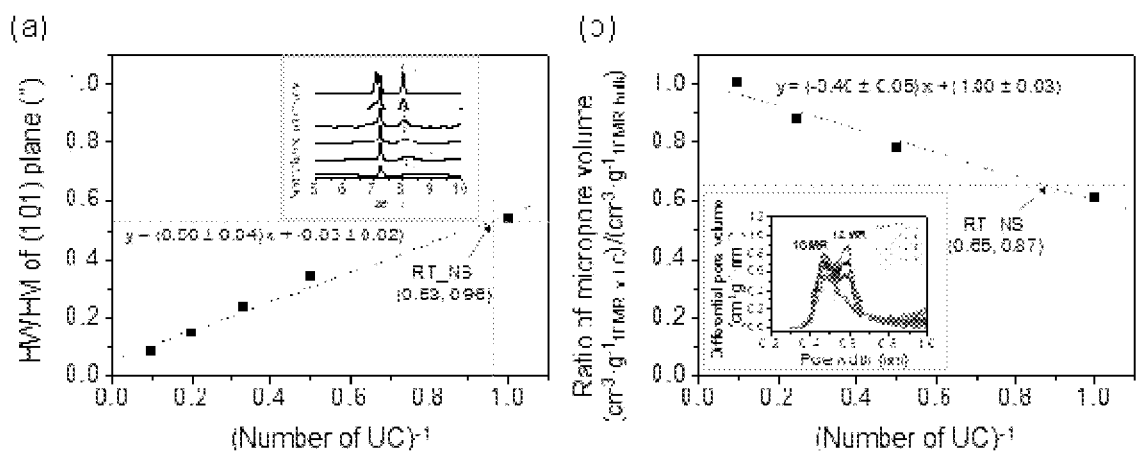
FIG. 4 shows (a) the half-width at half-maximum (HWHM) of an XRD peak corresponding to a (101) plane of an MWW type zeolite according to an embodiment of the present invention, having therein the DIFFaX-based XRD patterns shown in FIG. 11.

In the present embodiment, the present inventors attempted to quantify the number of UC nanosheets in the layered MWW type zeolites based on both XRD and micropore volume/area analyses (FIG. 4). As shown in FIG. 2(c), the XRD peak corresponding to the (101) plane in the range of 8 to 10° was broadened as the number of UC nanosheets decreased (i.e. moved toward 1-UC nanosheet delamination). Thus, the present inventors recognized that the corresponding half-width at half-maximum (HWHM) of the (101) plane showed linear behavior with respect to the reciprocal of the number of UC nanosheets (FIG. 4(a)). Notably, the ratio of the micropore volume related to the 10 MR pores to that in the bulk MWW zeolite also showed linear behavior with respect to the reciprocal of the number of UC nanosheets (FIG. 4(b)). From the correlation shown in FIG. 4(a), the present inventors estimated that RT_NS contained about 1.0 UC nanosheets on average. This value was slightly different (about 30%) from the estimated value (about 1.3 UC nanosheets) based on the similarity of the XRD pattern in FIG. 2(c). Specifically, a linear combination of 70% of 1 UC nanosheets and 30% of 2 UC nanosheets resulted in about 1.3 UC nanosheets on average. Remarkably, the thickness of the UC nanosheets was estimated to be 1.1 UC from the micropore-volume-based correlation (FIG. 4(b)). This self-consistency strongly indicates the reliability of the novel approach disclosed herein for estimating the degree of delamination of layered MWW zeolites. More importantly, this approach can be directly applied to quantify the degree of delamination in other types of layered materials. In contrast, the approach shown in FIG. 4 was not suitable for estimation of the number of UC nanosheets in HT_S_H.

In addition, the number of UC contained within HT_S_H and RT_NS was deduced from the external surface area, as reported in the literature. Assuming that MCM-22(C) mainly included 10 UC nanosheets (equivalent to a thickness of about 25 nm along the c-axis) with a square of 1 μm in the ab-plane, a comparison of the external surface areas suggests that HT_S_H and RT_NS largely included about 2 to 3 and about 3 to 4 UC nanosheets, respectively (Table 6). Thus, considering that HT_S_H had a large external surface area attributable to amorphization, HT_S_H likely included sheets thicker than 2 UC nanosheets. As mentioned above, comprehensive analyses based on the XRD results, and the surface area and volumes of RT_NS compared to those of MCM-22(C) showed that RT_NS included about 1 to 2 UC nanosheets because of the effective delamination of MCM-22(P) while maintaining high structural integrity. On the basis of the results, these 1 to 2 UC nanosheets aggregated, resulting in the about 3 to 4 UC nanosheets in RT_NS.

TABLE 6

Theoretical and measured values of external surface area of MWW type zeolite and derivatives thereof.

| Sample | a(nm)[b] | b(nm)[b] | c(nm) | External surface ($m^2/g$) | Relative value based on theoretical and measured values of external surface area of MCM-22(C) |
|---|---|---|---|---|---|
| Theoretical value | 1,000 | 1,000 | 25 (10-UC nanosheets) | 53 | 1 |
|  | 1,000 | 1,000 | 15 (6-UC nanosheets) | 87 | 1.6 |
|  | 1,000 | 1,000 | 7.5 (3-UC nanosheets) | 171 | 3.2 |
|  | 1,000 | 1,000 | 5.0 (2-UC nanosheets) | 255 | 4.8 |
|  | 1,000 | 1,000 | 2.5 (1-UC nanosheets) | 507 | 9.6 |
| MCM-22(C)[a] | N/A | N/A | N/A | 82 | 1 |
| HT_S_H[a] | N/A | N/A | N/A | 398 | 4.9 |
| RT_NS[a] | N/A | N/A | N/A | 278 | 3.4 |

[a]value calculated from N2 physisorption isotherm of FIG. 12(a1).
[b]value estimated from shape of MCM-22(P) of FIG. 8(a).
[c]theoretical value of external surface area of MWW type zeolite, calculated assuming that MWW type zeolite is cuboidal.

Figure 5:
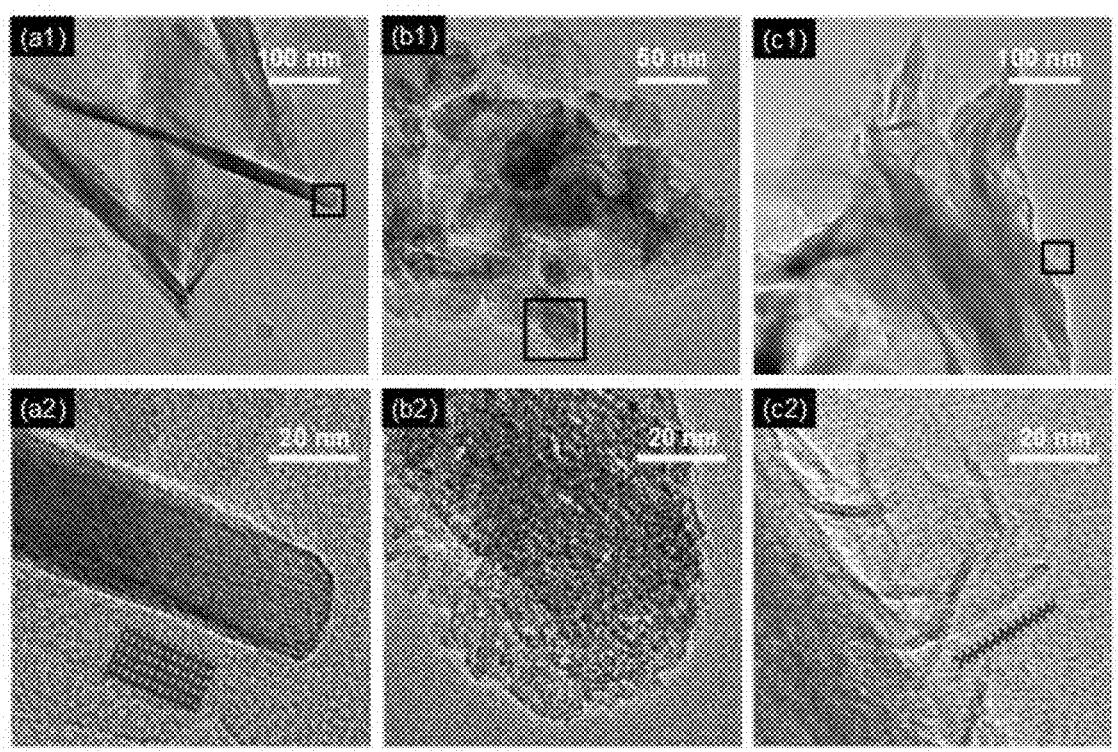
FIG. 5 shows TEM images of (a1)-(a2) MCM-22(C), (b1)-(b2) HT_S_H, and (c1)-(c2) RT_NS according to an embodiment of the present invention.
Figure 8:
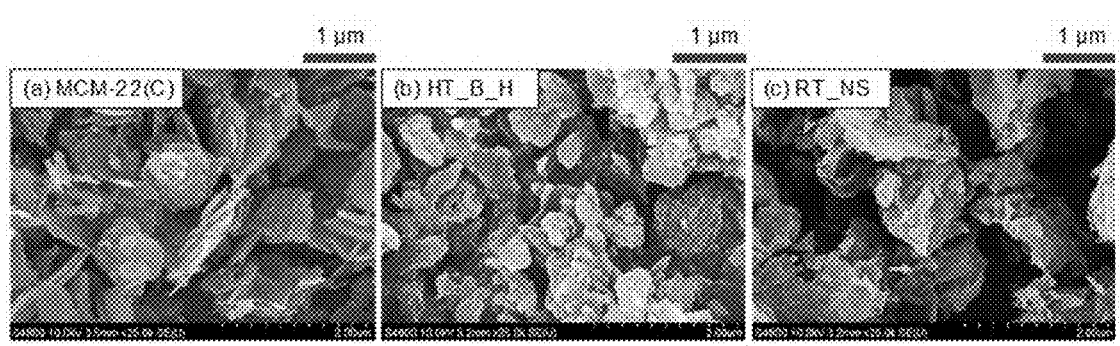
FIG. 8 shows SEM images of (a) MCM-22(C), (b) HT_S_H, and (c) RT_NS according to an embodiment of the present invention.
Figure 18:
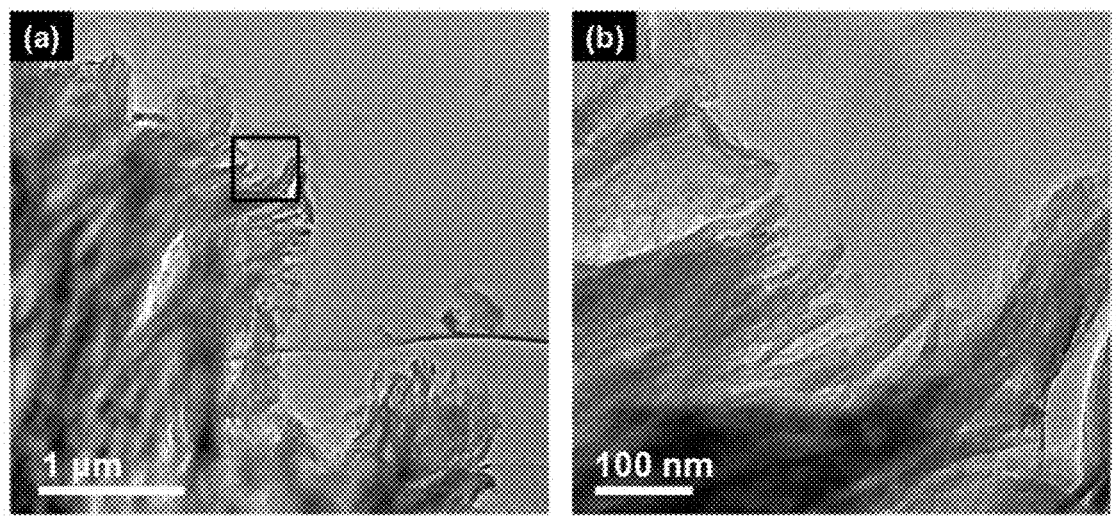
FIG. 18 shows TEM images of RT_NS at (a) low magnification and (b) high magnification according to an embodiment of the present invention.

Along with the SEM images in FIG. 8, the TEM images clearly show the shapes of MCM-22(C), HT_S_H, and RT_NS particles (FIG. 5). First, because MCM-22(C) had a disc-like shape with a high aspect ratio (FIG. 8(*a*)), the present inventors focused on finding the case where the shortest dimension (i.e., thickness) was observed (FIG. 5(*a*1)-(*a*2)). From the side view, MCM-22(C) had a thickness along the c-axis of about 28 nm, which was equivalent to about 10 UC thick (the thickness of 1 UC nanosheet: about 2.5 nm) (Luo, H. Y et al., Chem. Sci. 2015, 6(11), 6320-6324). It was noted that the TEM image of HT_S_H did not show the typical shape of MCM-22(C) particles, as expected from the SEM images thereof (FIG. 8(*a*)-(*b*)). Instead, it appears that irregular particles with a size of about 30 to 70 nm were aggregated. Particles with poorly defined shapes have been reported previously. In particular, the about 2-nm-sized mesopores can be easily seen in the HR-TEM image, as indicated by the yellow arrows in FIG. 5(*b*2). Finally, RT_NS likely consisted of curled layers, which included approximately 1 to 4 UC nanosheets (FIGS. 5(*c*1)-(*c*2) and 18). Furthermore, 1 UC nanosheets were observed at the edges and protruded outwards in a curled manner (FIG. 5(*c*2)). In particular, the 2-nm-sized mesopores in HT_S_H accounted for the drastic increase in $N_2$ adsorption at $P/P_0$ values greater than about $10^{-3}$ (FIG. 12(*a*1)), which was more clearly described by a sharp peak around 2 to 3 nm in the Barrett-Joyner-Halenda (BJH) analysis (FIG. 14). In the case of RT_NS, the curled layers, seemingly including 1 to 2 UC nanosheets in FIG. 5(*c*2), corroborated the conclusions based on XRD (an approximately 1.0 UC nanosheet, as shown in FIG. 4(*a*)) and micropore surface area (that is, an approximately 1.1 UC nanosheet, as shown in FIG. 4(*b*)). Based on the HR-TEM image of MCM-22(C), the present inventors further attempted to estimate the thickness and, thus, the number of UC nanosheets in HT_S_H and RT_NS via a comparison of the external surface areas thereof (Table 6). This simple approach allowed the present inventors to estimate that RT_NS included about 3 to 4 UC nanosheets, which was also supported by the TEM images in FIG. 18. Therefore, it can be concluded that RT_NS largely comprised of about 3 to 4 UC nanosheets, which were further formed of about 1 to 2 UC nanosheets.

Figure 19:
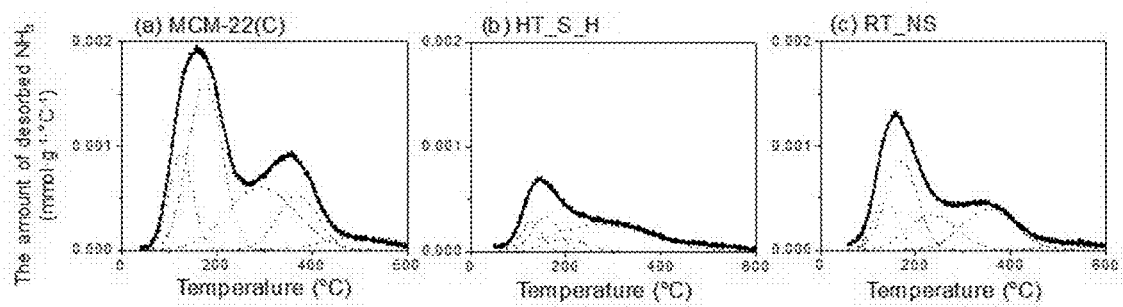
FIG. 19 shows $NH_3$-TPD-MS of (a) MCM-22(C), (b) HT_S_H, and (c) RT_NS based on temperature according to an embodiment of the present invention.

The BrØnsted acid sites (B acid sites) in the microporous and mesoporous/external surface areas in protonated form HT_S_H and RT_NS were quantified via FT-IR analysis using independent titration methods with Py and dTBPy (Table 2) and $NH_3$-TPD (FIG. 19). Herein, because the size of dTBPy is 1.05 nm, it can titrate the B acid sites in the mesoporous and external surfaces areas. Based on this approach, MCM-22(C) possessed all B acid sites of about 270 µmol/g, and two distinct peaks at 440 and 630 K were observed in the $NH_3$-TPD-MS results, similar to previously reported results (Ayrault, P. et al., J. Phys. Chem. B, 2004, 108, 13755-13763; Corma, A. et al., Zeolites, 1995, 15, 576-582). Of all B acid sites, about 41 µmol/g of the B acid sites were located as part of the external surface area, achieving an external/total acid site ratio of about 0.15, which was consistent with the external/total surface area ratio of about 0.14 (Table 4). This similarity indicates that the acid site titration approach was valid for the estimation of the textural properties of the hierarchically structured zeolites. After carrying out the delamination process, both HT_S_H and RT_NS had fewer B acid sites than those of MCM-22(C), as expected from the decrease in the Si/Al ratios (Table 1). For HT_S_H, the total B acid sites decreased to about 52%, comparable to those (about 54%) observed in previous studies, whereas the total B aid sites decreased to about 65% for RT_NS. The greater reduction in the total B acid sites observed for HT_S_H could be ascribed to the formation of an amorphous structure. Along with the decreased amount of total B acid sites, the distribution of acid sites was changed; about 77% and 61% of the total BrØnsted acid sites were located on the external+mesoporous surface areas for HT_S_H and RT_NS, respectively. Indeed, the external/total B acid site ratios for HT_S_H and RT_NS were quite similar to the external+mesoporous/total surface area ratios (Table 4). When the proton-exchange process was carried out at temperatures higher than 80° C., which has often been reported (Kim, H. et al., J., Catal. Today, 2018, 303, 150-158; Khare, R. et al., J. Catal., 2017, 348, 300-305; Zhang, Z. et al., Catal. Commun., 2008, 9, 60-64; Kumar, G. S. et al., J. Mol. Catal. A-Chem., 2007, 272, 38-44), the total B acid sites of all three samples (Table 7) were still comparable to those obtained after proton exchange at room temperature (Table 4). However, the B acid sites on the external+mesoporous surface areas were lower, as reflected by the decreased external/total B acid site ratios (Table 7).

TABLE 7

Quantitative values of Brønsted acid sites of MCM-22(C), HT_S_H, and RT_NS obtained by pyridine (Py) and 2,6-di-tert-butylpyridine (dTBPy) adsorption. Proton-exchange process for all samples was carried out at 80° C.

| Sample | PyH$^+$ (μmol/g) | dTBPyH$^+$ (μmol/g) | dTBPyH$^+$/PyH$^+$ |
|---|---|---|---|
| MCM-22(C) | 262 | 21 | 0.08 |
| HT_S_H | 124 | 81 | 0.65 |
| RT_NS | 175 | 70 | 0.40 |

ITQ-2, whose preparation method is identical to that of HT_S_H in the present invention, showed unique and much improved catalytic performances in the form of larger molecules and longer lifetimes, apparently because of the improved structural accessibility to acid sites. Considering that the RT_NS consisted of about 3 to 4 UC nanosheets (formed via aggregation of about 1 to 2 UC nanosheets) with a well-preserved MWW type zeolite structure and had a considerable number of total Brønsted acid sites with a higher accessibility, the catalytic investigation of RT_NS is a necessary follow-up task.

Example 4: Structural Integrity of Delaminated Particles

Figure 6:
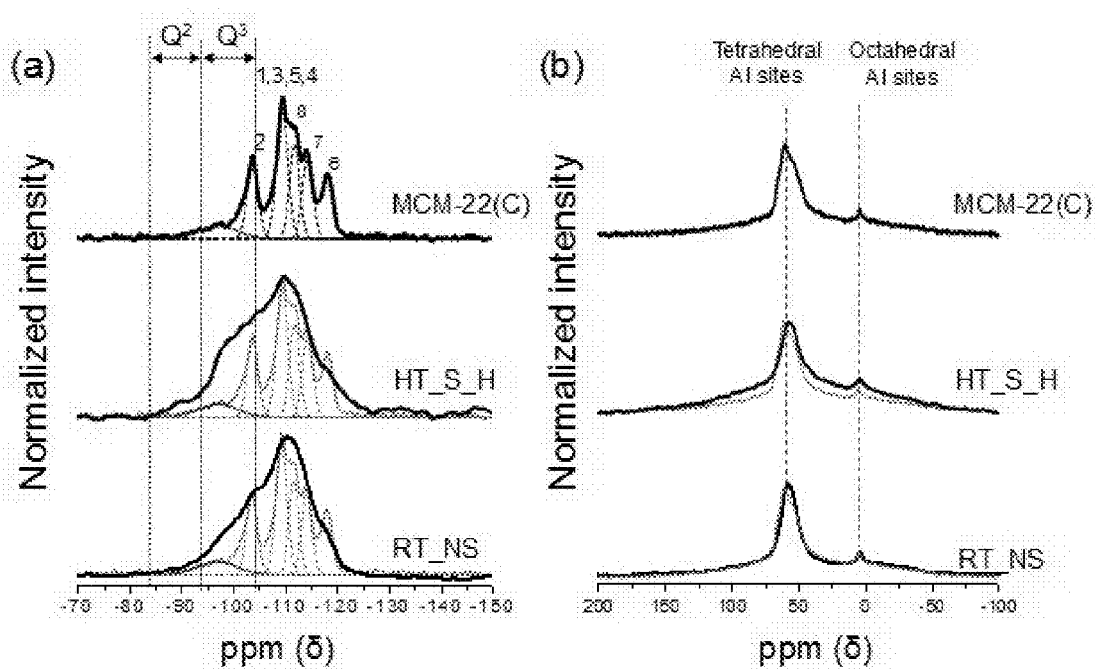
FIG. 6 shows (a)$^{29}$Si and (b)$^{27}$Al MAS NMR spectra of MCM-22(C), HT_S_H, and RT_NS according to an embodiment of the present invention.
Figure 20:
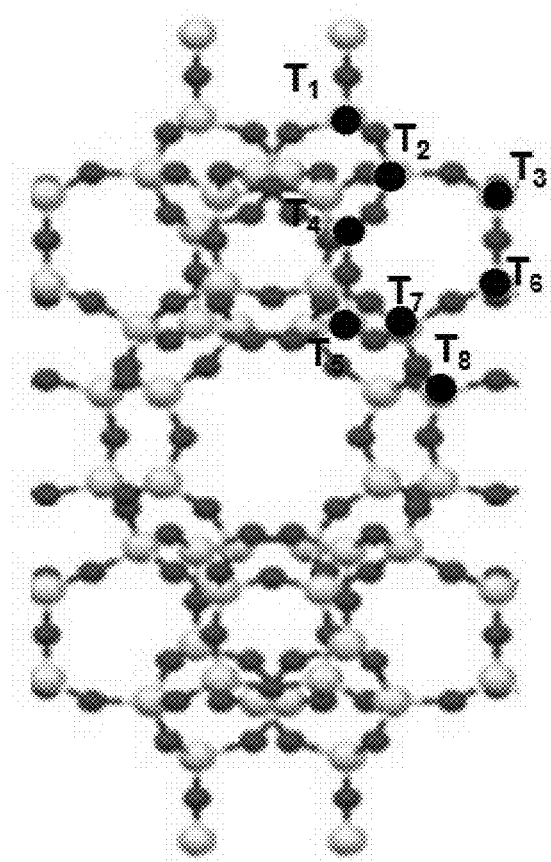
FIG. 20 shows a unit lattice of an MWW type zeolite according to an embodiment of the present invention.

Finally, the structural integrity of the delaminated particles was investigated using $^{29}$Si and $^{27}$Al MAS NMR spectra (FIG. 6). The $^{29}$Si MAS NMR spectra shown in FIG. 6(a) indicate that MCM-22(C) had high structural integrity based on eight representative peaks of the independent T sites (FIG. 20): $T_2$ at 103.4 ppm, $T_1$ and $T_3$ to $T_5$ at 109.0 ppm, $T_8$ at 113.7 ppm, $T_7$ at 118.1 ppm, and $T_6$ at 120.0 ppm. Accordingly, the portion of $Q^3$ sites (Si(30)1OH) at about 97.7 ppm was negligible. In addition, the $^{27}$Al MAS NMR spectra of MCM-22(C) in FIG. 6(b) contained two peaks at about 57 ppm and 0 ppm, which are related to the tetrahedral and octahedral Al sites, respectively. Furthermore, it appears that the peak at about 57 ppm consisted of two peaks centered at about 54 ppm and 61 ppm, representing the Al sites in (1) $T_6$ and $T_7$ and (2) $T_1$ to $T_5$ and $T_8$, respectively (Vuono, D. et al., Microporous Mesoporous Mater., 2006, 97, 78-87). Both the $^{29}$Si and $^{27}$Al MAS NMR spectra of MCM-22(C) were in good agreement with those of previous studies (Vuono, D. et al., Microporous Mesoporous Mater., 2006, 97, 78-87; Camblor, M. A. et al., J. Phys. Chem. B, 1998, 102, 44-51; Aiello, R. et al., Microporous Mesoporous Mater., 2000, 35-6, 585-595; Elyassi, B. et al., Microporous Mesoporous Mater., 2014, 193, 134-144; Kennedy, G. J. et al., J. Am. Chem. Soc., 1994, 116, 11000-11003). The $^{29}$Si MAS NMR spectra of both HT_S_H and RT_NS were quite different from that of MCM-22(C) (FIG. 6(a)). First, the NMR peaks were smeared out in the spectra of both HT_S_H and RT_NS compared to the clear NMR peaks of MCM-22(C). For fair comparison, the NMR peaks of MCM-22(C) were overlaid in FIG. 6(a). Despite the broadened spectra, the present inventors found a noticeable change in the NMR spectra of HT_S_H and RT_NS; in particular, the intensity of the $T_6$ site peaks was decreased, the $T_2$ and $T_{1, 3-5}$ site peaks were broadened and coalesced, and the intensities of peaks corresponding to the $Q^2$ and $Q^3$ sites increased. The decreased intensities of the $T_6$ site peaks could be attributed to bond breakage or changes in the Si—O—Si angle, as reported by Maheshwari et al. (Maheshwari, S. et al., J. Am. Chem. Soc., 2008, 130, 1507-1516). However, bond breakage at the $T_6$ site rather than the $T_7$ and $T_8$ sites seems implausible because these three sites are located in the intermediate layers and, thus are likely to be well preserved after delamination. Therefore, it is more reasonable to presume that the intensity of the $T_6$ site peaks decreased as a result of Si—O—Si angle changes. The coalesced peaks corresponding to the $T_2$ and $T_{1, 3-5}$ sites could be attributed to the formation of amorphous siliabout (Elyassi, B. et al., Microporous Mesoporous Mater., 2014, 193, 134-144). The comparison of the intensities or areas between the NMR peaks revealed that HT_S_H contained a larger amount of amorphous silica than RT_NS. Therefore, the present inventors concluded that the zeolitic micropores in HT_S_H decomposed into amorphous silica based on the Ar adsorption isotherms and $^{29}$Si MAS NMR spectra (FIGS. 15 and 6(a)). In addition, the increase in the NMR peak intensities corresponding to the $Q^2$ and $Q^3$ site peaks for both HT_S_H and RT_NS indicated that some Si—O—Si bonds were broken after the delamination process. More specifically, the NMR peak intensities arising from $Q^2$ and, especially, $Q^3$ sites were much increased for HT_S_H. Furthermore, the $^{27}$Al MAS NMR spectrum corresponding to RT_NS had no such difference compared to that of MCM-22(C). Therefore, the present inventors can conclude that the structural integrity of RT_NS was high based on the $^{29}$Si and $^{27}$Al MAS NMR spectra. This conclusion concerning the structural integrity is consistent with corresponding textural/structural properties determined by XRD analyses and Ar adsorption (FIG. 4) and morphologies determined by the HR-TEM (FIG. 5).

The present invention provides a simple yet reliable method of delaminating the MWW type zeolite through direct calcination of the swollen MCM_22(P) under ambient conditions. Through substantial characterization of the physicochemical properties of HT_S_H and RT_NS, the present inventors found that the HT_S_H structure collapsed and was converted to an amorphous phase, apparently caused by the severe reaction conditions (80° C. and pH of about 13.5) used for swelling. On the other hand, RT_NS showed well-preserved MWW intermediate layers or unit cells along the c-axis and consisted of bundles or stacks of such intermediate layers with approximately 3 to 4 UC nanosheets, which were formed via aggregation of about 1 to 2 UC nanosheets. In particular, rigorous analysis of the structural (XRD) and textural (Ar adsorption) features, along with the selective acid site titration method and NMR spectra, revealed that RT_NS consisted of a well-preserved MWW type zeolite structure with a large number of total Brønsted acid sites. Because RT_NS has high potential as a unique catalyst, RT_NS may be applied to catalytic reactions (starting with conventional methanol-to-hydrocarbon catalysis).

INDUSTRIAL APPLICABILITY

According to the present invention, it is possible to synthesize a zeolite having a monolayer structure through a simple calcination process, rather than a conventional complicated process. The synthesized monolayer zeolite can be used as a commercial catalyst in an alkylation process. Due to the structural characteristics thereof, accessibility of the monolayer zeolite to reactants and products is improved, whereby an increase in reaction activity and an increase in the lifetime of the catalyst can be expected.

In addition, a c-direction layer of the monolayer zeolite is separated, and a separation membrane having high permeability can be synthesized using the same.

Although specific configurations of the present invention have been described in detail, those skilled in the art will appreciate that the above description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method of preparing a monolayer zeolite nanosheet comprising:
   mixing a multilayer MWW type zeolite precursor with water and a swelling agent to swell intra-layers of the multilayer zeolite precursor;
   recovering a solid material from the mixture containing a swollen zeolite precursor, and then calcining the solid material to obtain a monolayer zeolite nanosheet; and
   drying at a temperature of 50 to 110° C. for 10 to 24 hours after the recovering the solid material,
   wherein the swelling agent is a mixture of a salt compound having a functional group of alkyltrimethylammonium and a salt compound having a functional group of tetrapropylammonium, and
   wherein an Si/Al ratio of the multilayer MWW type zeolite precursor is 10 to 200.

2. The method of preparing a monolayer zeolite nanosheet of claim 1, wherein the salt compound having the functional group of alkyltrimethylammonium is one or more selected from the group consisting of dodecyltrimethylammonium bromide, cetrimonium bromide and trimethyloctadecylammonium bromide.

3. The method of preparing a monolayer zeolite nanosheet of claim 1, wherein the salt compound having the functional group of tetrapropylammonium is one or more selected from the group consisting of tetrapropylammonium bromide, tetrapropylammonium fluoride, tetrapropylammonium chloride and tetrapropylammonium hydroxide.

4. The method of preparing a monolayer zeolite nanosheet of claim 1, wherein the mixing is performed at a temperature of 25 to 80° C. for 16 to 20 hours.

5. The method of preparing a monolayer zeolite nanosheet of claim 1, wherein the calcining is performed at a temperature of 400 to 700° C. for 1 to 40 hours.

6. The method of preparing a monolayer zeolite nanosheet of claim 1, wherein the multilayer MWW type zeolite precursor is prepared by adding an organic structure-directing agent.

7. The method of preparing a monolayer zeolite nanosheet of claim 1, wherein a half-width at half-maximum (HWHM) of a (101) plane of the monolayer zeolite nanosheet shows linear behavior with respect to a reciprocal of a number of unit cell nanosheets of the zeolite in a c-direction.

8. The method of preparing a monolayer zeolite nanosheet of claim 1, wherein a ratio of a micropore volume of the monolayer zeolite nanosheet shows linear behavior with respect to a reciprocal of a number of unit cell nanosheets of the zeolite in a c-direction.

9. A monolayer zeolite nanosheet prepared by the method according to claim 1, wherein particles having about one or two unit cell thickness, are aggregated into the monolayer zeolite nanosheet having about three to four unit cell thickness along c-axis.

10. A catalyst comprising the monolayer zeolite nanosheet of claim 9.

11. A method of separating $H_2$ comprising contacting the monolayer zeolite nanosheet of claim 9 with a mixture containing $H_2$ to separate $H_2$ from the mixture.

* * * * *